US011642267B2

(12) United States Patent
Kea et al.

(10) Patent No.: US 11,642,267 B2
(45) Date of Patent: May 9, 2023

(54) PATIENT POSITIONING AND SUPPORT SYSTEM

(71) Applicant: Sage Products, LLC, Cary, IL (US)

(72) Inventors: Alex D. Kea, Cary, IL (US); Hester C. Fletcher, Louisa, VA (US); David P. Beck, Crystal Lake, IL (US); Michael P. Flores, Cary, IL (US)

(73) Assignee: Sage Products, LLC, Cary, IL (US)

(*) Notice: Subject to any disclaimer, the term of this patent is extended or adjusted under 35 U.S.C. 154(b) by 1220 days.

(21) Appl. No.: 16/007,712

(22) Filed: Jun. 13, 2018

(65) Prior Publication Data

US 2018/0353360 A1 Dec. 13, 2018

Related U.S. Application Data

(60) Provisional application No. 62/518,668, filed on Jun. 13, 2017.

(51) Int. Cl.
*A61G 7/10* (2006.01)
*A61G 7/065* (2006.01)
(Continued)

(52) U.S. Cl.
CPC ............ *A61G 7/065* (2013.01); *A61G 7/005* (2013.01); *A61G 7/1026* (2013.01); *A61G 7/1028* (2013.01); *A61G 13/126* (2013.01); *A61G 13/1265* (2013.01); *A61G 7/075* (2013.01); *A61G 13/04* (2013.01); *Y10S 5/925* (2013.01)

(58) Field of Classification Search
CPC ...... A61G 7/1028; A61G 7/10; A61G 7/1025; A61G 7/1026
See application file for complete search history.

(56) References Cited

U.S. PATENT DOCUMENTS 4,528,704 A * 7/1985 Wegener .................. B65G 7/06
180/125
4,662,366 A 5/1987 Tari
(Continued)

FOREIGN PATENT DOCUMENTS

EP 3 162 347 A1 5/2017
WO WO-2017/197326 A1 11/2017

OTHER PUBLICATIONS

International Search Report and Written Opinion for International Application No. PCT/US2018/037372, dated Sep. 13, 2018, 13 pages.

*Primary Examiner* — Peter M. Cuomo
*Assistant Examiner* — Ifeolu A Adeboyejo
(74) *Attorney, Agent, or Firm* — Foley & Lardner LLP

(57) ABSTRACT

A system for supporting a patient on an inclined surface includes an inflatable device. The inflatable device includes a top sheet of material connected to a bottom sheet of material, the top sheet and the bottom sheet defining a cavity to be inflated, wherein the bottom sheet of material is configured to permit air to pass from the cavity to the exterior of the device and to flow between a bottom surface of the device and a support surface upon which the device is configured to rest, and an input configured for receiving air to inflate the device. The system further includes a high-friction pad configured to attach to the top sheet of material, and at least one attachment system configured to maintain the device on a support surface.

4 Claims, 17 Drawing Sheets

(51) Int. Cl.

| | |
|---|---|
| ***A61G 7/005*** | (2006.01) |
| ***A61G 13/12*** | (2006.01) |
| *A61G 7/075* | (2006.01) |
| *A61G 13/04* | (2006.01) |

(56) References Cited

U.S. PATENT DOCUMENTS

| | | | | |
|---|---|---|---|---|
| 5,199,121 | A * | 4/1993 | Payne | A47G 9/0207 5/413 R |
| 5,549,121 | A | 8/1996 | Vinci | |
| 6,102,936 | A * | 8/2000 | Augustine | A61F 7/00 5/606 |
| 6,467,106 | B1 * | 10/2002 | Heimbrock | A61G 7/1026 5/654 |
| 6,966,275 | B2 * | 11/2005 | Whitehill | A01K 1/0353 119/28.5 |
| 7,735,164 | B1 * | 6/2010 | Patrick | A61G 7/1021 5/81.1 HS |
| 8,001,635 | B2 | 8/2011 | Humbles | |
| 8,464,720 | B1 * | 6/2013 | Pigazzi | A61G 13/107 |
| 8,511,314 | B2 | 8/2013 | Pigazzi et al. | |
| 9,161,876 | B2 | 10/2015 | Pigazzi et al. | |
| 9,375,343 | B2 * | 6/2016 | Marshall | A61G 13/1225 |
| 2003/0159212 | A1 * | 8/2003 | Patrick | A61G 7/103 5/81.1 R |
| 2005/0076437 | A1 * | 4/2005 | Johnson | B60P 7/16 5/81.1 R |
| 2005/0091749 | A1 | 5/2005 | Humbles | |
| 2006/0162086 | A1 * | 7/2006 | Davis | A61G 7/1028 5/711 |
| 2007/0266494 | A1 * | 11/2007 | DeLuca | A61G 7/1028 5/81.1 R |
| 2008/0216231 | A1 * | 9/2008 | Lambarth | A61G 7/1026 5/81.1 HS |
| 2011/0296609 | A1 | 12/2011 | Giap | |
| 2012/0186012 | A1 * | 7/2012 | Ponsi | A61G 7/1026 5/81.1 R |
| 2012/0304384 | A1 * | 12/2012 | Scholz | A61F 7/0097 5/600 |
| 2013/0145549 | A1 * | 6/2013 | Piegdon | A61G 7/10 5/600 |
| 2014/0250601 | A1 | 9/2014 | Gomez | |
| 2014/0352072 | A1 | 12/2014 | Holladay | |
| 2016/0228281 | A1 | 8/2016 | Marshall et al. | |
| 2017/0049646 | A1 * | 2/2017 | Rigoni | A61G 7/1028 |
| 2017/0326011 | A1 | 11/2017 | Alvarez et al. | |

* cited by examiner

PATIENT POSITIONING AND SUPPORT SYSTEM

CROSS-REFERENCE TO RELATED PATENT APPLICATIONS

This application claims the benefit of and priority to U.S. Provisional Patent Application No. 62/518,668, filed Jun. 13, 2017, which is hereby incorporated by reference in its entirety.

BACKGROUND

The present invention generally relates to an apparatus, system, and method for supporting a patient for a medical procedure, and in particular for supporting a patient when positioned in a non-parallel or tilted position, such as in the Trendelenburg position.

When a patient is unconscious, disabled, or otherwise unable to move under their own power, there is difficulty in retaining patient positioning on a hospital bed or operating table. For example, when patients undergo surgery, it is often necessary to tilt the operating table on which the patient rests in order to gain access to the surgical area. Tilting the operating table results in the patient laying supine at an angle, wherein the patient's feet may be above the patient's head or the patient's head may be above the patient's feet. One such common positioning in surgery is the Trendelenburg position, where the patient is tilted at 15° to 45° and the patient's feet are elevated above the patient's head. When in the Trendelenburg position, it is difficult to maintain the patient's position upon the operating table. Current methods of maintaining patient positioning can cause injury to the patient or increase the patient's level of discomfort.

Furthermore, before, during, or after such a procedure, the patient may need to be re-positioned or transferred between surfaces, which can be difficult and time-consuming. Turning, positioning, transferring and/or boosting patient—types of "patient handling" activities—can result in injury to healthcare workers who push, pull, or lift the patient's body weight. For healthcare workers, the most prevalent cause of injuries resulting in days missed from work is overexertion or bodily reaction, which includes motions such as lifting, bending, or reaching and is often related to patient handling. These injuries can be sudden and traumatic, but are more often cumulative in nature, resulting in gradually increasing symptoms and disability in the healthcare worker.

Additionally, there is a risk of patient injury when turning, position, transferring, and/or boosting patients. Current methods of maintaining patient positioning on a support surface do not adequately hold the patient in place without a potential risk of injury to the patient. For patients who may be unconscious, disabled, or otherwise unable to move under their own power, any unintentional patient movement can cause injury or additional patient discomfort.

The present disclosure seeks to overcome certain of these limitations and other drawbacks of existing devices, systems, and methods, and to provide new features not heretofore available.

BRIEF DESCRIPTION OF THE DRAWINGS

To understand the present invention, it will now be described by way of example, with reference to the accompanying drawings in which.

DETAILED DESCRIPTION

Figure 1:
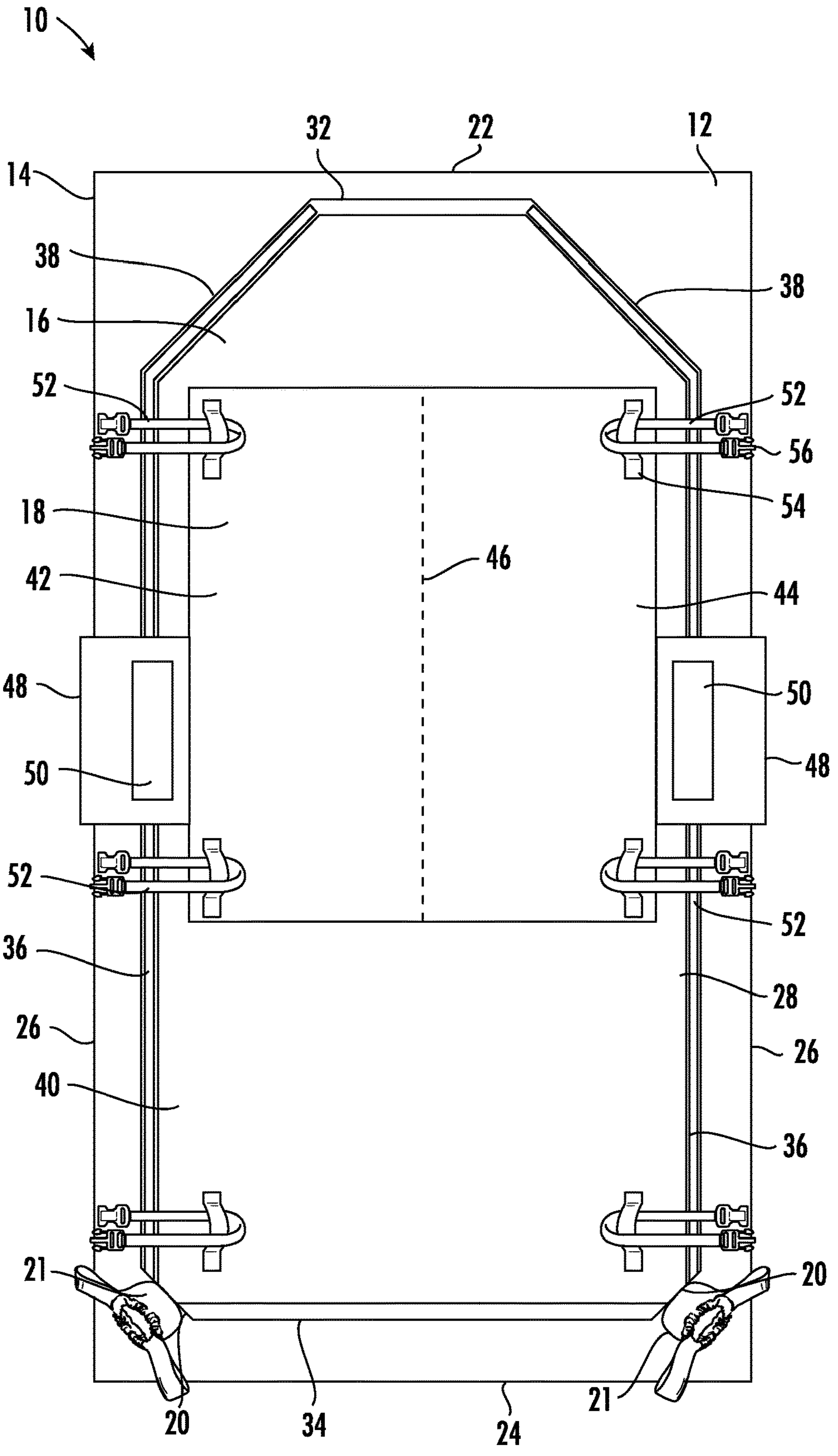
FIG. 1 is a top view of a first embodiment of an inflatable patient support system according to aspects of the disclosure.

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

The disclosure relates to a system or apparatus for positioning a patient, including an inflatable patient support device, a pad configured to be placed over the device, and/or a pump or other air output for inflation of the device, as well as systems including one or more of such devices and methods utilizing one or more of such systems and/or devices. Various embodiments of the invention are described below. The system may be used for supporting, transferring, positioning, boosting, turning, and/or otherwise moving a patient on a support surface or between support surfaces.

Referring now to the figures, and initially to FIG. 1, there is shown an example embodiment of an inflatable patient support system (hereinafter "system") 10 for use in positioning a patient resting on a support surface 12 of a support structure 14, such as a patient lying on a hospital bed, and for transferring the patient to or from the support surface 12. As shown in FIG. 1, the system includes an inflatable patient support device (hereinafter, "inflatable device") 16, a high-friction pad 18, such as a foam pad, configured to be placed over the device 16, and a set of inflation ports 20 coupled to port socks 21 for inflating the inflatable device 16. The high-friction pad 18 is shown lying on the inflatable device 16, with the inflatable device 16 lying on the support surface 12. The support surface 12 may be provided by a bed, gurney, stretcher, cot, operating table, or other support structure 14 for medical and/or patient care use, e.g., for supporting a person in a supine or other position. The support structure 14 and corresponding support surface 12 are not shown in detail, but may generally include known features of various support structures for medical and/or other patient care use, such as a frame and a support surface 12 supported by the frame, and has a head 22, a foot 24 opposite the head 22, and opposed sides or edges 26 extending between the head 22 and the foot 24. The support structure 14 may include one or more bed sheets (such as a fitted sheet or flat sheet), as well as pillows, blankets, additional sheets, and other components known in the art. Further, the support structure 14 may be adjustable such that the head 22 (or other parts) of the support structure 14 can be raised and lowered, such as to incline the patient's upper body. It is understood that the system 10 and the components thereof can be used with many different types of support structures 14, and may be used to transfer a patient from one support structure 14 to another support structure 14' of the same or a different type, as shown schematically in FIG. 15.

Figure 5:
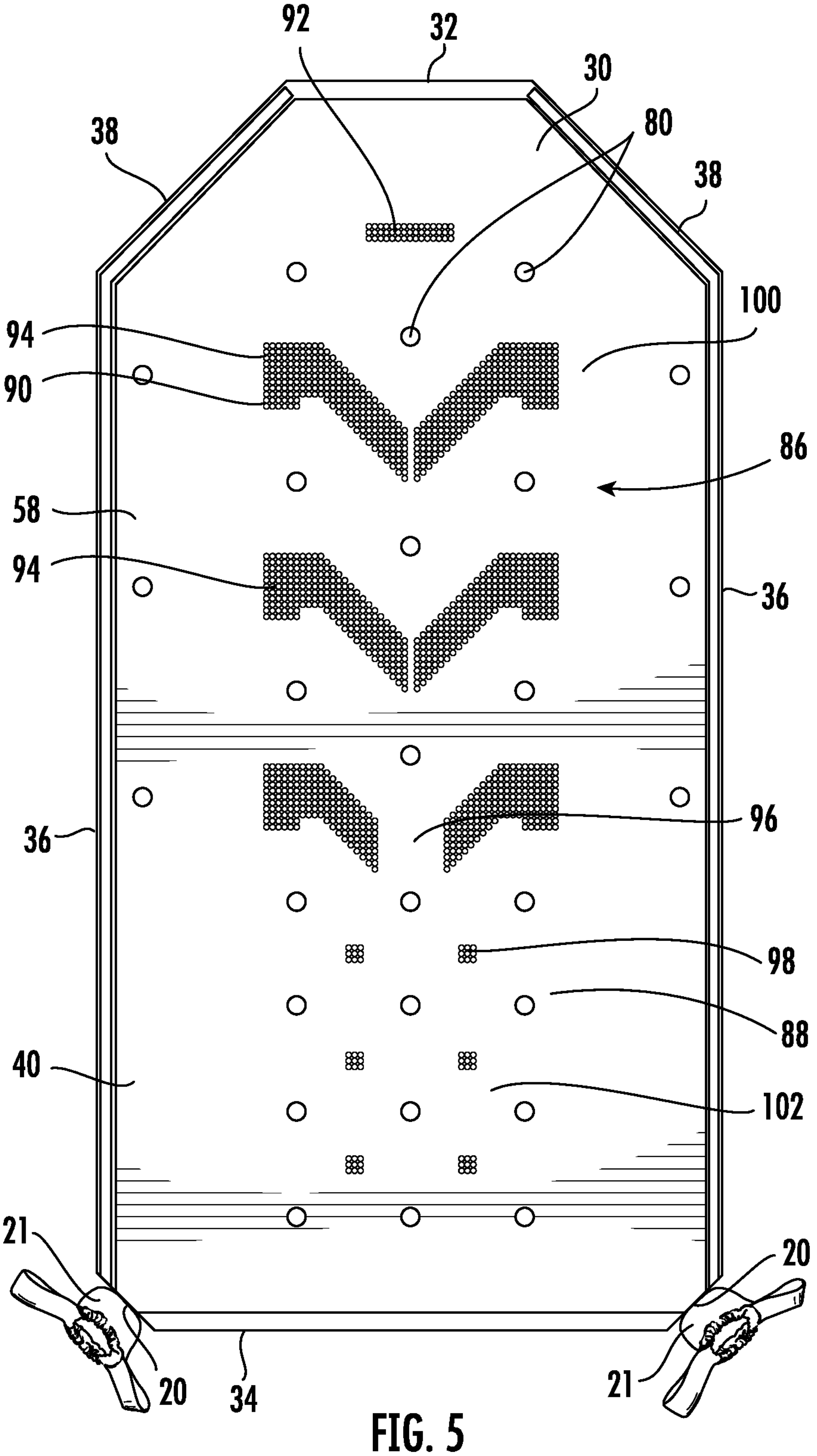
FIG. 5 is a bottom view of the portion of the inflatable patient support system of FIG. 4, shown in the non-inflated state, according to an embodiment.

The inflatable device 16 is flexible and foldable when in the non-inflated state. The inflatable device 16 is configured to be positioned on the support surface 12 so that a bottom surface 30 of the inflatable device 16 faces or confronts the support surface 12, and is supported by the support surface 12. For example, the bottom surface 30, as shown in FIG. 5, may be in contact with the support surface 12, or may face or confront the support surface 12 and/or be supported by the support surface 12 with one or more structures located between the bottom surface 30 and the support surface 12, such as a bed sheet as described above. The terms "facing" or "confronting" do not necessarily imply direct contact or engagement, and may include one or more structures located between the surface and the structure and the surface it is confronting or facing.

As shown in FIG. 1, the inflatable device 16 has a generally rectangular shape with a chamfered edge, having peripheral edges 32-38, including the head edge 32, foot edge 34, side edges 36, and chamfered edges 38. The side edges 36 extend between the foot edge 34 and each chamfered edge 38, while the chamfered edges 38 extend from each side edge 36 to the head edge 32. The shape of the inflatable device 16 may be different in other embodiments, including different shapes with varying degrees of symmetry. In some embodiments, the inflatable device 16 may be rectangular with no chamfered edges 38. However, the inflatable device 16 in a configuration with chamfered edges 38 provides some advantages. During inflation, when the air enters cavity, it inflates the periphery of the inflatable device 16 surrounding the patient first (described further below), and then gently raises the patient above the support surface 12. Removing the corners to create the chamfered edges 38 allows the inflation profile to be conformed more closely to the patient's anatomical contours. During deflation of the inflatable device 16, a configuration with chamfered edges 38 allows for more complete deflation. With the full rectangular configuration, when the inflatable device 16 is deflating, air may remain near the head. By removing the corners to create the chamfered edges 38, the weight of the shoulders and head of the patient are sufficient to adequately deflate the cavity of air. In other embodiments, the inflatable device 16 may have a different shape.

The high-friction pad 18 is placed on top of the inflatable device 16 to provide a resting surface for a patient. In one embodiment, the high-friction pad 18 is smaller in size than the inflatable device 16, and is configured for only the upper body of the patient to lie on top of the high-friction pad 18. In another embodiment, the high-friction pad 18 may be of similar size as the inflatable device 16 and may be configured for the entire body of the patient to lie on top of the high-friction pad 18. The high-friction pad 18 is generally shown to include a first section 42 and a second section 44, separated by perforations 46, and arm wraps 48, which in some embodiments include openings 50. In the embodiment shown in FIG. 1, both the inflatable device 16 and the high-friction pad 18 include attachment systems including straps 52, anchors 54, and buckles 56. The high-friction pad 18 and its components are described in greater detail in reference to FIGS. 7-14.

Figure 2:
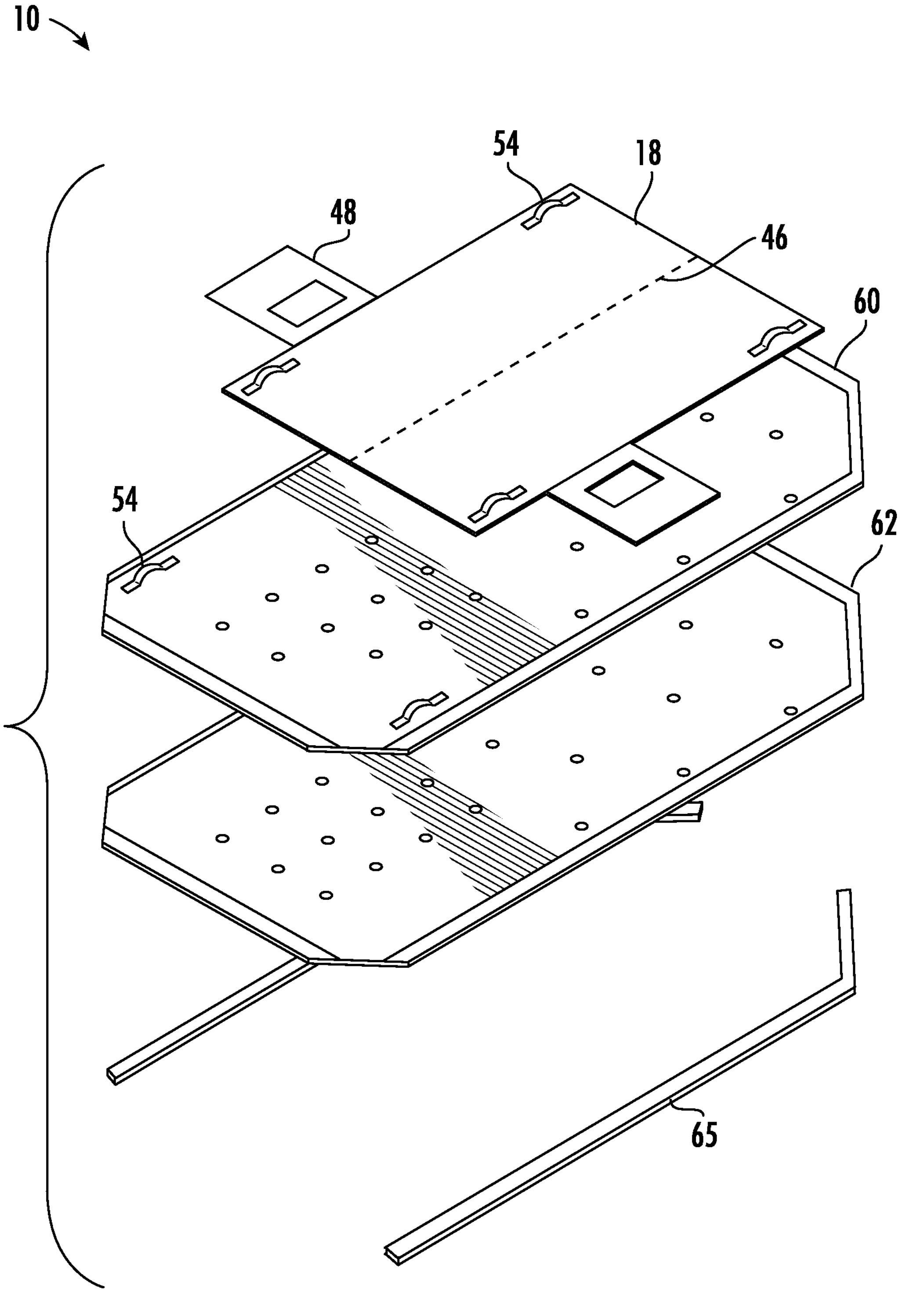
FIG. 2 is a perspective exploded view of the inflatable patient support system of FIG. 1, according to an embodiment.

The inflatable device 16 generally includes an inflatable body 40 that defines the internal cavity configured to be inflated with air or another gaseous substance. Referring to FIG. 2, the inflatable body 40 is defined by at least a top sheet 60 forming a top wall of the cavity and a bottom sheet 62 forming a bottom wall of the cavity, with the top sheet 60 and the bottom sheet 62 connected together to define the cavity there between. In the embodiment shown, the top and bottom sheets 60, 62 are two separate pieces of sheet material that are connected together around their peripheries, such as by stitching and/or adhesives, or one or more other connection techniques described herein. In some embodiments, the top and bottom sheets 60, 62 may be connected to one another by a side wall or a plurality of side walls made from a flexible or rigid material attached to each sheet at their peripheries. In other embodiments, the top and bottom sheets 60, 62 may be made from a single piece of material that is folded over and connected by stitching along the free ends or that is formed in a loop, or the top and/or bottom sheets 60, 62 may be formed of multiple pieces. Both the top and bottom sheets 60, 62 may be formed of the same material in one embodiment, although these components may be formed of different materials in another embodiment. It is understood that either or both the sheets 60, 62 may have a single layer or multiple layers that may be formed of the same or different materials.

Additionally, the sheet material(s) of the top and bottom sheets 60, 62 may have properties that are desirable for a particular application. Some exemplary characteristics for a selected material include favorable breathability, durability, imagining compatibility, flammability, biocompatibility, pressure distribution profile, heat transmission, electrical conductivity, and cleaning properties. For example, if the inflatable device 16 is intended to be left beneath the patient for an extended period of time, the sheets 60, 62 may be breathable fabrics or other materials that have sufficient breathability to allow passage of heat and moisture vapor away from the patient, while also having sufficient resistance to air passage to retain inflation of the inflatable body 40. As another example, when the inflatable device 16 is used solely as a patient transfer device that is not left beneath a patient for an extended period of time, breathability may not be a primary concern when selecting a material for the sheets 60, 62. In such an embodiment, factors such as durability, ease of cleaning, liquid repellence, and cost may be properties of primary concern. Some examples of materials suitable for use in constructing the sheets 60, 62 that meet these criteria but do not provide a high degree of breathability include woven polyester and non-woven polypropylene. The material(s) of the top and bottom sheets 60, 62 may also include specific frictional properties, as described herein. Additionally, if the inflatable device 16 is designed to be breathable, the material of the top and bottom sheets 60, 62 may have greater permeability to water vapor (i.e., breathability) than its permeability to liquid or air. As an example, the top and/or bottom sheets 60, 62 may be formed of a material that is liquid repellant and/or impermeable and may have little to no air permeability, while being permeable to moisture vapor, such as polyester and/or nylon (polyamide). Some materials may further include an additive, such as coatings, laminates, and the like. For example, a coated nylon taffeta material is one example of a material which can provide these properties, and further, the coating on such a material may have a higher coefficient of friction than the sheet material itself, creating a configuration with a high-friction material (the coating) on one surface and a low-friction material (the sheet material with or without an additive) on the opposite side, as described in greater detail elsewhere herein. The additives to the material may provide one or more of the following: decreasing the static potential (as described below), increasing the coefficient of friction of the top sheet, and decreasing the coefficient of the bottom sheet.

In some embodiments, static electrical potential may form in the inflatable device 16 due to friction caused by airflow through the inflatable device 16, sliding between the top and bottom sheets 60, 62, and/or sliding the inflatable device 16 against the support surface 12. This static potential can create significant electrical shocks in some situations. In order to avoid this effect, an anti-static additive, such as carbon black powder or carbon fiber, may be applied to the top and bottom sheets 60, 62, either as a material additive or as a coating (e.g., a spray or brush-on coating). In another embodiment, the surfaces of the top and/or bottom sheets 60, 62 that face in towards the cavity may be laminated or coated with urethane, PVC, or other material having similar properties. Coating or covering the sheets 60, 62 with such materials may result in a reduction of the static discharge potential of the sheets 60, 62. In another example, conductive threads may be used in the stitching of the inflatable device 16 to ground the apparatus. Other static-reducing techniques may be used in other embodiments.

In one embodiment, the top and bottom sheets 60, 62 are both a nylon taffeta sheet material. The surfaces of the top and bottom sheets 60, 62 that face in towards the cavity may be coated with urethane. The top sheet 60 may have on its top face (outward facing) a urethane laminate additive. In a second preferred embodiment, the top and bottom sheets 60, 62 are both a nylon taffeta sheet material. The top surface of the bottom sheet 62 that faces in towards the cavity may have a PVC coating. The top sheet 60 may have on its top face (outward facing) a polyurethane additive. In other preferred embodiments other combinations of the above materials are used for the top and bottom sheets 60, 62. Materials such as these provide an additional benefit of imaging capability. With some materials and manufacturing processes, radiographic artifacts from the device may appear in and distort images. The materials and manufacturing processes selected for inflatable device 16 preferably will not present any radiographic artifact.

Still referring to FIG. 2, in some embodiments, the inflatable device 16 includes one or more handles 65 to facilitate pulling and other movement of the inflatable device 16. Such handles 65 may be configured for multiple different types of movement, including "boosting" a patient on the support surface 12 (i.e., moving the patient toward the head 22). The inflatable device 16 has handles 65 formed by strips of a strong material that are connected (e.g., stitched) in periodic fashion to the bottom surface 30 at or around both side edges 36 of the inflatable device 16, the chamfered edges 38, and/or the head edge 32 of the device. The non-connected portions can be separated slightly from the inflatable device 16 to allow a healthcare provider's hands to slip underneath, and thereby form the handles 65. In the embodiment having chamfered edges 38, the handles 65 along the chamfered edge 38 may be connected with a greater distance between the connection locations (e.g., stitched locations), such that the handles 65 may be separated from the inflatable device 16 to hook, stretch, or otherwise pass over a corner of the support surface 12, such as bed, on which the inflatable device 16 is positioned. This provides a more secure relationship between the inflatable device 16 and the support surface 12, when needed. In some such embodiments, the handles 65 may be connected to the bottom surface 30 only at the transition, or corner, between the chamfered edge 38 and the side edge 36, and between the chamfered edge 38 and the head edge 32. In other embodiments, the inflatable device 16 may include a different number or configuration of the handles 65 as described above, including handles that may extend outward from the sides of the inflatable device 16 for greater leverage. Further, the handles 65 may be connected to the inflatable device 16 in a different way, such as by heat welding, sonic welding, adhesive, etc. Other types of handles may be utilized in further embodiments.

Figure 3:
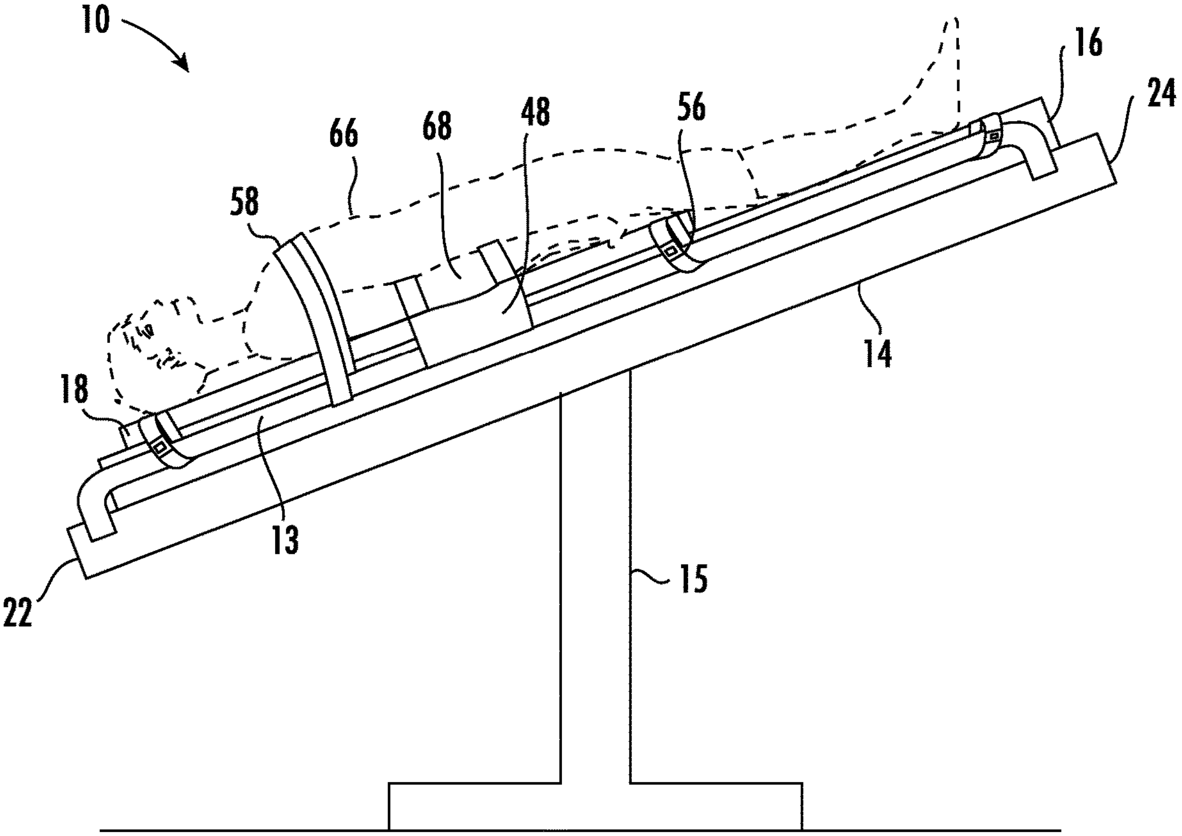
FIG. 3 is a side view of the inflatable patient support system of FIG. 1 in use on a support structure, according to an embodiment.
Figure 9:
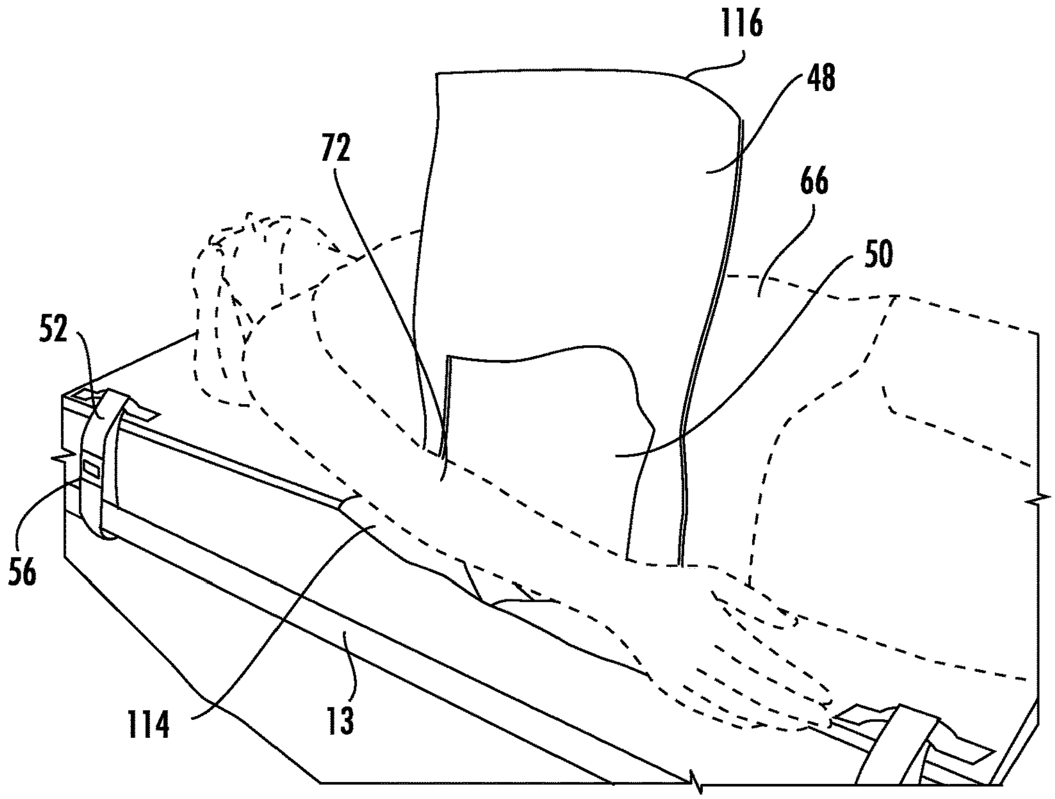
FIG. 9 is a detailed view of one embodiment of an arm strap being wrapped around a patient's arm, according to an embodiment.
Figure 10:
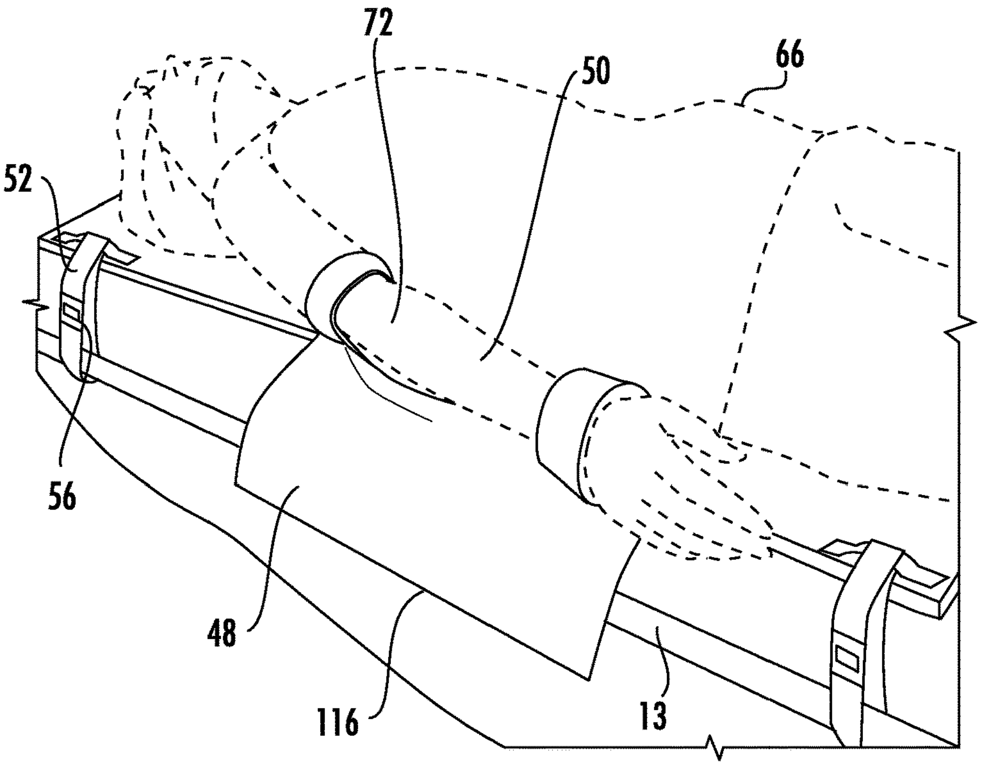
FIG. 10 is a detailed view of the arm strap of FIG. 9 in use with a patient, according to an embodiment.

The high-friction pad 18 and, in some embodiments, an additional high friction material, help in maintaining the position of a patient 66 on a support structure 14, as depicted in FIG. 3. The inflatable device 16 rests upon support structure 14 with a support structure beam 15 configured to engage with the floor. The high-friction pad 18 attaches to the top of the inflatable device 16, making contact with a top surface of the inflatable device 16, which may include a high-friction material. In one embodiment, the support structure 14 and support structure beam 15 can relate to an operating table. In other embodiments, the support structure 14 and support structure beam 15 can relate to a hospital bed or a stretcher. Referring to FIGS. 9 and 10, the patient's arm 72 is held in place using arm wraps 48 on the high-friction pad 18, with the openings 50 allowing a portion of the patient's arm 72 to remain exposed in order to place an intravenous (IV) line. The straps 52 of the inflatable device 16 and the high-friction pad 18 are wrapped around a rail 13 of the support structure 14 and attached using buckles 56. In other embodiments, the straps 52 may use a different attachment mechanism, such as snaps or hook and loop fastener. An additional chest strap 58 is attached to the rail 13 and over the chest of the patient 66, to help further prevent movement of the patient 66. When positioning a patient in the Trendelenburg position, the support structure 14 is tilted so that the head 22 of the support structure 14 is positioned lower than the foot 24 of the support structure 14, putting the patient 66 at an inclined angle. The high-friction pad 18 serves to increase the coefficient of friction between the patient 66 and the inflatable device 16. The high-friction pad 18 may include a top surface 78 further comprising a high friction material to further increase the coefficient of friction. This increased coefficient of friction serves to maintain the patient positioning when the patient 66 is placed at an incline as shown in FIG. 3.

Figure 4:
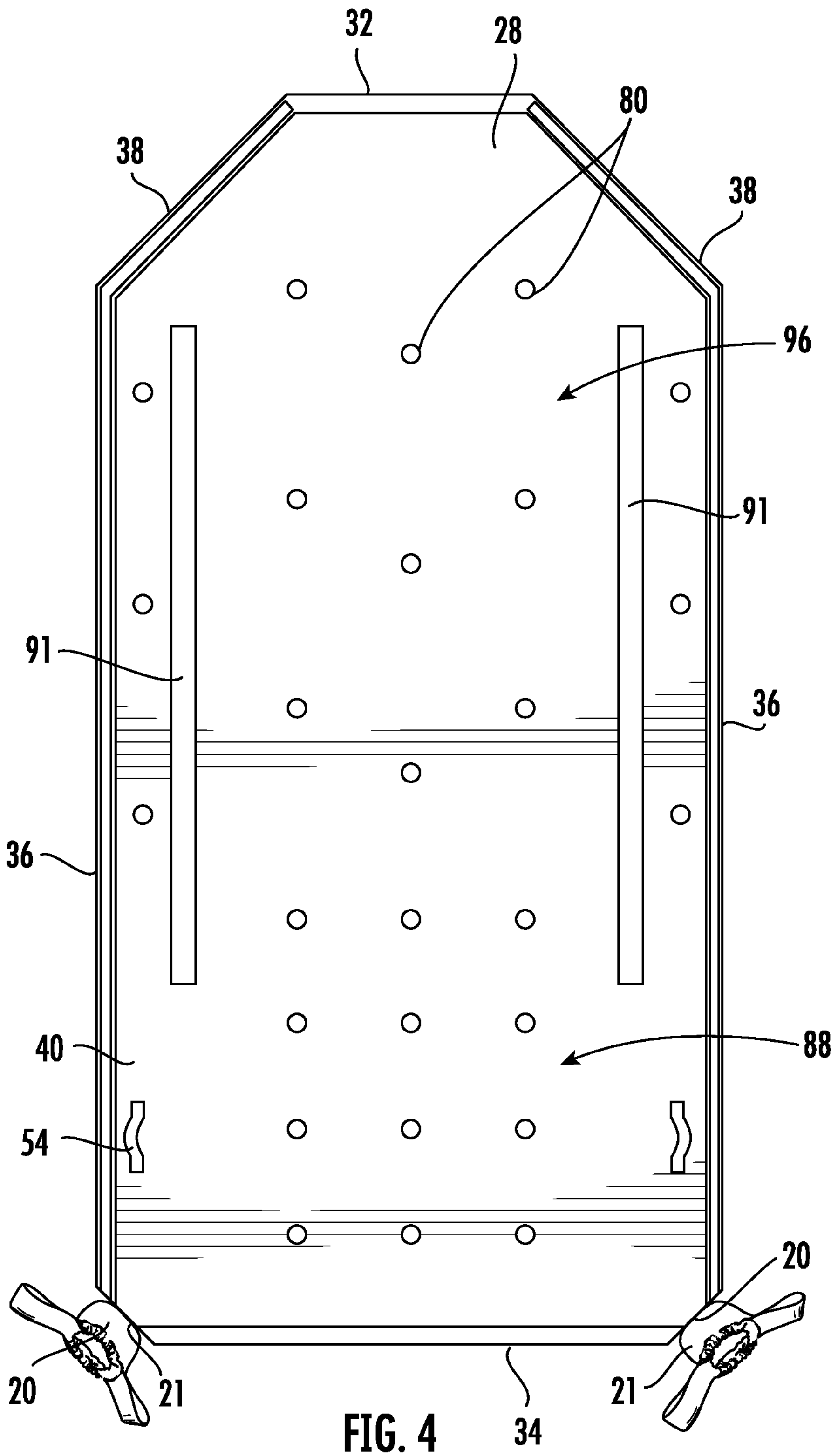
FIG. 4 is a top view of a portion of the inflatable patient support system of FIG. 1, shown in the non-inflated state, according to an embodiment.
Figure 6:
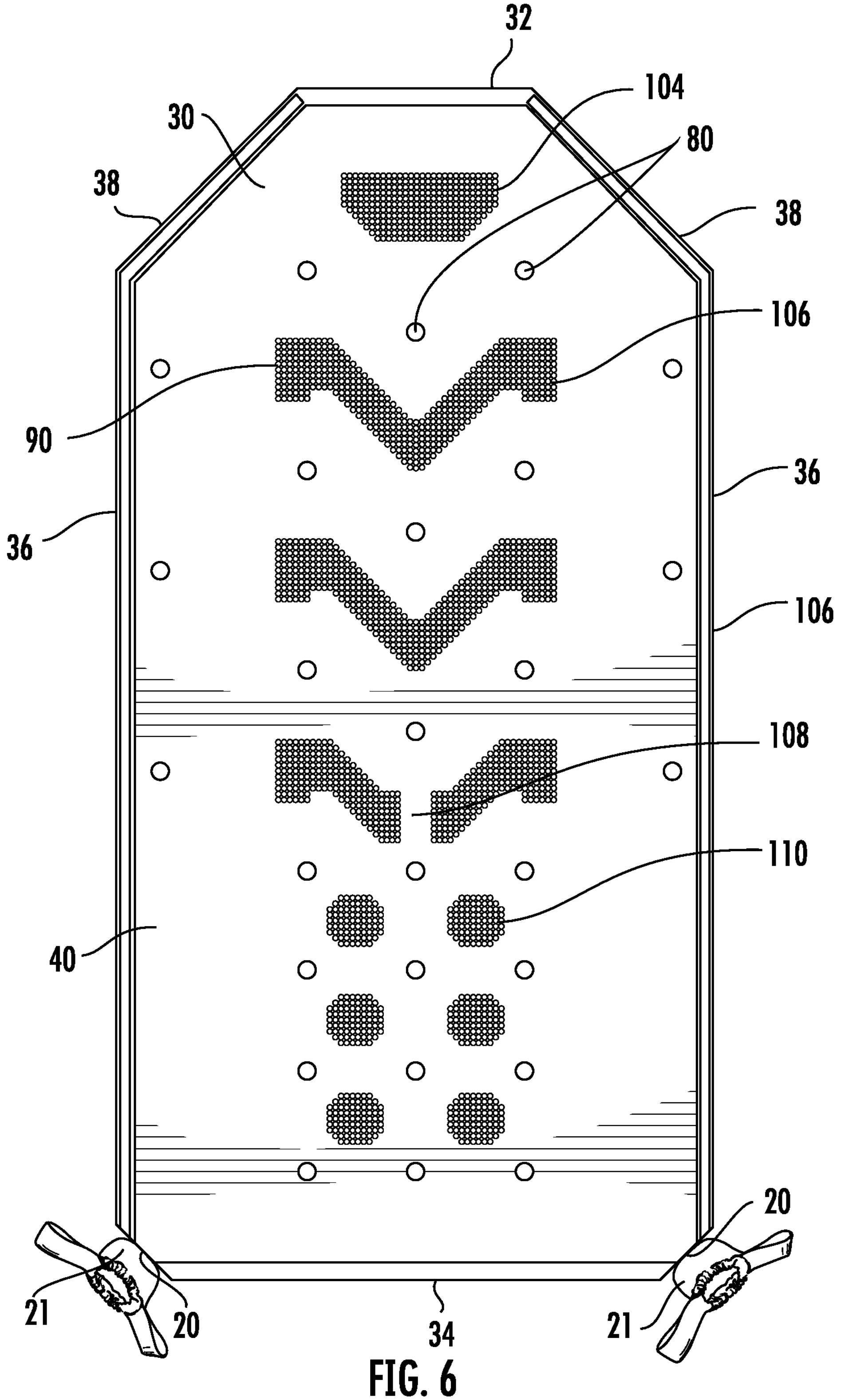
FIG. 6 is a bottom view of a second configuration of the portion of the inflatable patient support system of FIG. 4, shown in the non-inflated state, according to an embodiment.

Now referring to FIGS. 4-6, the inflatable device 16 of the system 10 is shown in greater detail. The inflatable body 40 of the inflatable device 16 may include one or more inflation-limiting structures to create a specific inflated shape for the inflatable device 16. In general, an inflation-limiting structure is a structure connected to the top and bottom walls of the cavity (e.g., the top and bottom sheets 60, 62 as shown in FIG. 2) that limits the degree to which the top and bottom walls can move apart from each other during inflation. In the embodiment shown, the inflatable body 40 has a plurality of connection areas 80 between the top sheet 60 and the bottom sheet 62 to form inflation-limiting structures. The connection areas 80 in this embodiment are circular in shape and are formed by stitching the top and bottom sheets 60, 62 together by stitches in a plurality of locations. In some embodiments, the top and bottom sheets 60, 62 are stitched together by stitches arranged in one or more concentric circles for reinforcement and strength of the connection area 80. In some embodiments, the stitches of a connection area 80 are arranged in three concentric circles. Stitching in three concentric circles provides the added benefit of decreasing the volume of air capable of residing within the circular stitch which could lead to stitch failure, and also minimizes the air flow through the stitch holes.

Figure 19:
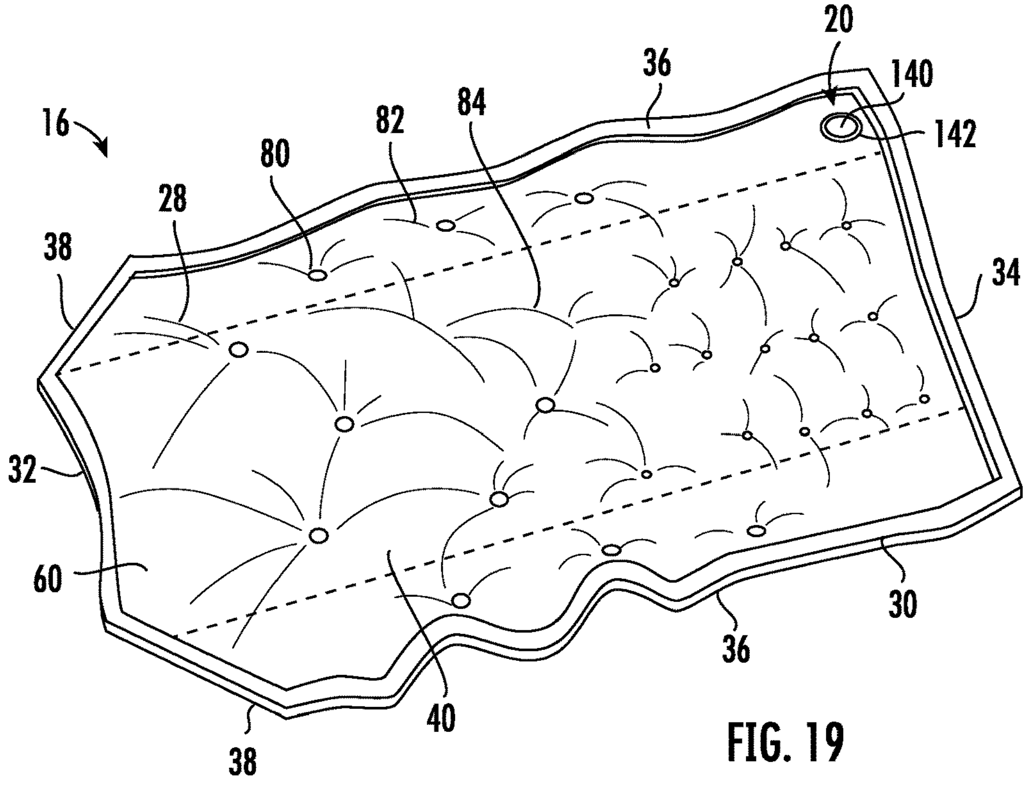
FIG. 19 is a top perspective view of a second embodiment of an inflatable patient support device.

In other embodiments, the connection areas 80 are formed by stitching arranged in different shapes, and/or a different connection method (e.g., adhesive, sealing, etc.) is used instead of or in addition to the stitching. In general, the cavity is effectively unable to expand fully (or at all in some circumstances) during inflation at the location of or near each connection area 80, and the connection areas thereby act as inflation-limiting structures. The areas between the connection areas 80 form swells 84, as shown in FIG. 19, when the inflatable device 16 is inflated (see FIG. 19), and the sizes of the swells 84 may depend on factors such as the configuration, orientation, and spacing of the connection areas 80 or other inflation limiting structures. For example, the greater the distance between a connection area 80 and the next nearest connection area 80, the larger the swell 84 created between the two. In this way, larger swells can be formed in certain portions by arranging the connection areas farther apart, as with the outer bolsters described later herein. In other embodiments, separate inflation-limiting structures may be used to connect the top and bottom sheets 60, 62, such as columns, gussets, baffles, etc., which may be connected to the top and bottom sheets 60, 62 and extend across the cavity. Any inflation limiting structures, including the connection areas 80, may have various different configurations in other embodiments, including linear, polygonal, and various curved or angular shapes.

The fully inflated device 16 has a shape that is defined by the configuration of the edges 32-38 of the inflatable device 16, and the arrangement of the inflation-limiting structures, among other factors. The arrangement of the connection areas 80 (i.e., spacing, locations, and orientations with respect to each other) may influence the degree of inflation that occurs locally around each connection area 80, and the connection areas 80 may be arranged in various patterns to accomplish specific desired shapes and characteristics of the inflatable device 16 upon inflation.

For example, in the embodiment of FIGS. 4-6 the connection areas 80 are arranged in a first pattern 86 in a portion of the inflatable device 16 more proximate to the head edge 32 and a second pattern 88 in a portion of the inflatable device 16 more proximate to the foot edge 34, which second pattern 88 is different from the first pattern 86. The connection areas 80 in the first pattern 86 are arranged in a plurality of jogged structures, the jogged structures having two connection areas 80 being generally aligned along a lateral line (i.e., parallel to the head and/or foot edges 32, 34) and a third connection area 80 being offset from that lateral line. Viewed another way, the connection areas 80 in the first pattern 86 are arranged in three longitudinal columns (i.e., extending between the head and foot edges 32, 34) of equally-spaced connection areas 80, with the center column being offset longitudinally from the left and right columns. The connection areas 80 in the second pattern 88 are arranged in a plurality of parallel lateral and longitudinal lines. In this embodiment, the second pattern 88 is arranged with four parallel lateral lines and three parallel longitudinal lines of connection areas 80. The connection areas 80 in the second pattern 88 are spaced more closely to each other compared to the first pattern 86, which allows the swells 84 in the area of the first pattern 86 to inflate to a larger degree than in the area of the second pattern 88.

The connection areas 80 of the upper jogged structure are spaced at a distance from the head edge 32 that is greater than the space between the upper jogged structure and the next jogged structure. In this way, a larger swell is created near the head edge, which provides a head support portion for a patient on the inflatable device 16. The head portion is higher than the area of the first pattern 86. Likewise, the connection areas 80 in the second pattern 88 are spaced more closely to each other compared to the first pattern 86, which allows the swells 84 in the area of the first pattern 86 to inflate to a larger degree than in the area of the second pattern 88. In this configuration, the area of the first pattern 86 is slightly raised with respect to the area of the second pattern 88 when inflated, creating greater lift and support for the head and upper body of the patient 66 when resting on the inflated device 16.

In the embodiments of FIGS. 4-6, the outward-most connection areas 80 are spaced farther from the edges 32-38 of the inflatable device 16 than they are spaced from other connection areas 80, thereby allowing the areas around the edges 32-38 of the inflatable device 16 to inflate to a greater degree. This arrangement of the connection areas 80 creates a bolster or peripheral cushion that is inflated to a greater degree relative to the central area of the inflatable device 16 where the connection areas 80 are arranged closer together. The peripheral cushion extends around at least some of the edges 32-38 of the inflatable device 16, and the central area is at least partially surrounded by the peripheral cushion. In this configuration, during inflation, air moves around the periphery first to raise the bolsters and supports the patient 66. This is due in part to the larger spaces between the connection areas 80 and therefore, provides a path of least resistance for the flow of air. The comfort and security of the patient is improved by having the peripheral cushion and other areas, for example the head portion, which are raised higher than other areas while the device remains inflated. The inflation of the peripheral cushion before the central portions also allows for quicker inflation of the device as compared with other devices that have a uniform inflation profile due to the less tortuous path for the air to follow. Finally, due to the configuration of the peripheral cushion and the inclination for the cushion portions to form first, the inflatable device 16 can automatically straighten, unfold, uncurl, etc. when inflation begins. For example, if a portion of the inflatable device 16 is folded under itself, it will automatically correct and flatten out at the onset of inflation.

Referring to FIG. 4, the top surface 28 of the inflatable device 16 includes two connection strips 91 located along the side edges 36. The connection strips 91 are configured to attach a bottom surface 79 of the high-friction pad 18 to the top surface 28 of the inflatable device 16. The connection strips 91 extend from the head portion of the inflatable device 16, located close to the chamfered edges 38, down the side edges 36. In the embodiment shown, the connection strips 91 do not fully extend down the full length of the side edge 36. In other embodiments, the connection strips 91 may extend the entirety of the side edge 36 to the foot edge 34. In other embodiments, the connection strips 91 may have a different configuration, such that they extend along the head edge 32, the foot edge 34, and the side edges 36, or any combination thereof. In some embodiments, the connection strips 91 are made of a first portion hook and loop fastening material, for engagement with a counterpart portion of the hook and loop fastener on the high-friction pad 18. In other embodiments, the connection strips 91 are a different attachment mechanism, such as a plurality of snaps or other fastening mechanisms. The top surface 28 of the device also includes two anchors 54 of a connecting system, through which straps 52 (shown in FIG. 1) can pass to secure the inflatable device 16 to the support structure 14. In this embodiment, the two anchors 54 are located near the bottom of the inflatable device 16 near the bottom edge 34. In other embodiments (not shown), additional anchors 54 are provided on the top surface 28 of the inflatable device 16, for example, two additional anchors spaced apart along each side edge 36.

Referring to FIGS. 5 and 6, the inflatable device 16 includes a plurality of passages 90 in the bottom sheet 62 that permit air to pass from the cavity to the exterior of the inflatable device 16. The passages 90 extend from the cavity through the bottom sheet 62 to the exterior of the inflatable device 16. Air passing through the passages 90 is forced between the bottom surface 30 of the inflatable device 16 and the surface upon which the inflatable device 16 sits (e.g., the support surface 12), reducing friction between the bottom surface 30 and the support surface 12. This permits easier movement of the inflatable device 16 when a patient 66 is positioned on the inflatable device 16, as described in greater detail elsewhere herein. In various embodiments, the passages 90 have a diameter in the range of 0.6 mm to 1.2 mm, or any range therebetween. In some embodiments, the passages 90 have a diameter in the range of 0.75 mm to 1.05 mm, or any range therebetween. In some embodiments, the passages 90 have a diameter of approximately 0.9 mm. In some embodiments, the passages 90 have a diameter of approximately 1.0 mm. The diameter of the passages impacts, at least partly, the effectiveness of the inflatable device 16 for maneuvering a patient. For example, if the passages 90 are too small, they may not allow enough air to pass through and will not be effective in decreasing the friction between the bottom surface 30 and the surface upon which it sits. On the other hand, if the passages are too large, too much air will pass through and the inflatable device 16 will partially or wholly deflate, also minimizing the effectiveness of the inflatable device 16.

As stated above, the passages 90 of the inflatable device 16 are intended to pass air between the bottom surface 30 of the inflatable device 16 and the support surface 12 upon which the inflatable device 16 sits. The effectiveness of these passages 90 in doing so is also impacted by the arrangement of the passages 90 in the bottom sheet 62. Several exemplary arrangements are shown in the figures, and described below. Generally, the passages 90 are arranged entirely, or more densely, in areas of the bottom sheet 62 that are in contact areas, where the bottom sheet 62 contacts the support surface 12 when the inflatable device 16 is inflated and supporting a patient. The inflatable device 16 may also have non-contact areas. In particular, when the inflatable device 16 is inflated, the connection areas 80 and the areas surrounding them are drawn in towards the cavity when inflated (due to the top sheet 60 and bottom sheet 62 being sewn together in these areas) and the bottom sheet 62 in these areas does not contact the surface. Accordingly, passages 90 positioned in this area would not be as effective for the intended purpose. Thus, it is preferred that all or most of the passages 90 are arranged in areas in between and spaced at a distance from the connection areas 80, which are the areas that are in contact with the surface when the device is inflated and supporting a patient.

FIG. 5 illustrates the passages 90 in a first embodiment. The passages in this embodiment are arranged in four configurations having in the range of 800 to 1000 total passages. In some embodiments, the total number of passages 90 is in the range of 850 to 950. In some embodiments, the total number of passages 90 is in the range of 890 to 910. Toward the head edge 32 of the inflatable device 16 there is a first configuration. The first configuration of passages 90 is a rectangular group 92 of passages 90. In this embodiment, the group 92 has twelve parallel longitudinal columns of three passages 90. The second configuration is located near the portion of the inflatable device 16 for carrying the upper torso and hips of the patient. The second configuration of passages is made up of groups 94 of passages 90 that are positioned between the connection areas 80 of the first pattern 86. The groups 94 of passages 90 form a substantially V-shaped configuration with a base of the V pointing in the direction of the foot edge 34. The groups 94 have in the range of 300 to 350 passages 90. The third configuration of passages 90 in this embodiment is similar to the second configuration except for a space 96 between each side of the V such that the passages do not meet in a point near the center. In the embodiment shown, the third configuration of passages is located between the first pattern 86 and the second pattern 88 of connection areas 80. In some embodiments, the third configuration is the same as the second configuration. A fourth configuration of passages 90 is made up of a plurality of groups 98 of passages 90, arranged in longitudinally extending columns between the longitudinal columns of the second pattern 88 of connection areas. Each group 98 in this embodiment includes nine passages arranged in a symmetrical square arrangement. In other embodiments, the passages 90 may be shaped, located, and/or configured differently, such as by using more or fewer passages that are smaller or larger in size and/or positioned relative to one another in a different shape or configuration.

The distribution of the passages 90 may vary depending on the desired performance of the inflatable device 16. In some embodiments, the passages 90 are more densely distributed in some portions of the inflatable device 16 relative to other portions of the inflatable device 16. The passages 90 in the embodiment illustrated in FIG. 5 are distributed at a relatively high density in a first area 100 of the inflatable device 16 more proximate to the head edge 32 that is positioned beneath the head, upper torso and hips of the patient 66. The passages 90 in this embodiment are distributed relatively less densely in a second area 102 of the inflatable device 16 more proximate to the foot edge 34 that is positioned beneath the legs of the patient 66. In other embodiments, the inflatable device 16 may have a different arrangement of passages 90, such as a symmetrical or evenly-distributed arrangement. In an additional embodiment (not shown), some or all of the passages 90 may be covered by one or more air-permeable members on the inner and/or outer surfaces of the bottom sheet 62, such that the air passes through the air-permeable member(s) when exiting the passages 90. This configuration may be particularly useful in embodiments where the passages 90 are larger in size, to limit airflow through the passages 90 and/or improve diffusion of air flowing through the passages 90. In certain configurations, portions of an inflation-limiting member may cover one or more of the passages 90. As used herein, an "air-permeable material" is a material that permits air to pass through, without the necessity for manually forming holes, passages, perforations, slits, openings, etc., in the material, such as by mechanical and/or laser cutting methods.

FIG. 6 illustrates the passages 90 arranged according to a second embodiment. The embodiment shown in FIG. 6 can be incorporated in an inflatable device 16 that includes many features that are similar or identical to the features shown and described above with respect to the embodiments in FIG. 5, both in structure and in function. The passages 90 in the embodiment of FIG. 6 are arranged in four configurations having in the range of 1400 to 1700 total passages. In some embodiments, the total number of passages 90 is in the range of 1500 to 1650. In some embodiments, the total number of passages 90 is in the range of 1550 to 1600. Toward the head of the inflatable device 16 there is a first configuration. The first configuration of passages 90 is a group 104 of passages. In this embodiment, the group 104 is shaped like a truncated funnel which is wider near the top and narrows. At its widest portion, the group 104 has 18 passages 90 arranged in a line. The second configuration is located near the portion of the inflatable device 16 for carrying the upper torso and hips of the patient. The second configuration of passages is made up of groups 106 of passages 90 that are positioned between the connection areas 80 of the first pattern 86. The groups 106 of passages 90 form a substantially V-shaped configuration with a base of the V pointing in the direction of the foot edge 34. The groups 106 have in the range of 800 to 950 passages 90. The third configuration of passages 90 in this embodiment is similar to the second configuration except for a space 108 between each side of the V such that the passages do not meet in a point near the center. In the embodiment shown, the third configuration of passages is located between the first pattern 86 and the second pattern 88 of connection areas 80. In some embodiments, the third configuration is the same as the second configuration. A fourth configuration of passages 90 is made up of a plurality of groups 110 of passages 90, arranged in two longitudinally extending columns between the longitudinal columns of the second pattern 88 of connection areas. Each group 110 in this embodiment includes thirty-seven passages arranged in an octagonal configuration. This octagonal configuration allows for the optimum pattern of passages 90 to be exposed to the support surface 12 when placed amongst a plurality of connection areas 80. In other embodiments, the passages 90 may be shaped, located, and/or configured differently, such as by using more or fewer passages that are smaller or larger in size and/or positioned relative to one another in a different shape or configuration.

The distribution of passages 90 is not limited to the specific arrangements shown in the embodiments of FIGS. 5 and 6. The passages may vary in number and distribution in any way that provides a sufficient amount of surface area for the effective passage of airflow between the bottom surface 30 of the inflatable device 16 and the surface upon which the inflatable device 16 sits. In some embodiments, the effective surface area of the passages 90 is in the range of 0 to 3% of the total area of the bottom sheet 62. In some embodiments, the effective surface area of the passages 90 is in the range of 0.5% to 2% of the total area of the bottom sheet 62. In some embodiments, the effective surface area of the passages is approximately 1.5% of the total area of the bottom sheet 62.

In some embodiments, the top surface 28 of the inflatable device 16 has at least a portion formed of a high-friction or gripping material and the bottom surface 30 has at least a portion formed of a low-friction material. The high-friction material may be in the form of one or more pieces of high-friction sheet material connected to the high-friction material of the inflatable body 40 in a surface-to-surface, confronting relation to form a layered structure, in various embodiments. For example, the high friction material may be a knitted material, which can enhance comfort, and may be made of polyester and/or another suitable material. The material can then be treated with a high friction substance, such as a hot melt adhesive or appropriate plastic, which can be applied as a discontinuous coating to promote breathability. In another embodiment, both the top and bottom sheets 60, 62 are made from the low-friction material, such as by using a low-friction sheet material, and the high-friction material may be connected to at least the top sheet 60. For example, the high-friction material may be or include a coating applied to the inflatable body 40, such as a spray coating or silkscreen. This coating may be a polyurethane coating that is waterproof and/or breathable in one embodiment. In a further embodiment, the portion of the inflatable body 40 forming the high-friction material (e.g., top sheet 60) may be formed of the high-friction material, while the portion of the inflatable body 40 forming the bottom surface 30 (e.g., bottom sheet 62) may be formed of the low-friction material. It is noted that the high-friction material may form or cover the entire top surface 28 of the inflatable device 16 in one embodiment, or may only form or cover a portion of the top surface 28 in another embodiment, e.g., the low-friction material may form a portion of the top surface 28, with the edges of the high-friction material being recessed from the edges 32-38 of the inflatable device 16. Similarly, the low-friction material may form at least a portion of the bottom surface 30 of the inflatable device 16.

In some embodiments, the bottom surface 30 may also have at least a portion formed of a high-friction or gripping material. In this embodiment, the high-friction material is preferably positioned in the non-contact areas (e.g., the areas of the bottom sheet 62 that are not in contact with the support surface when the inflatable device 16 is inflated). In this way, the bottom sheet 62 has a desirable low friction quality when the inflatable device 16 is inflated and is being used to lift or otherwise maneuver the patient. However, when the inflatable device 16 is not inflated (i.e. is not being used to maneuver the patient) and the patient is laying on top of the inflatable device 16 on a support surface, the high friction material comes into contact with the surface and minimizes slipping and moving of the inflatable device 16 relative to the surface. Any of the high friction materials or additives described above with respect to use on the top surface 28 may also be used on the bottom surface 30. The inflatable device 16 may have a high friction material on the bottom surface 30 that is the same as that which is used on the top surface 28, or the high friction material on the bottom surface 30 may be different than that which is used on the top surface 28. In some embodiments, the high friction material may be a directional glide material, which allows relative movement between the material and an external element (i.e., the support surface, a sheet, a positioning member, etc.) in one or more certain directions and prevents relative movement in other directions.

As described in greater detail below, the low-friction material permits sliding of the inflatable device 16 in contact with the support surface 12. The high-friction material provides increased resistance to slipping or sliding of the patient 66 and/or the high-friction pad 18 on which the patient 66 may be lying, in contact with the inflatable device 16, and increased resistance to slipping of the inflatable device 16 on the support surface when it is not inflated (i.e., not being used for maneuvering of the patient), or a controlled relative movement between elements of the system by way of a directional glide material. The low-friction material may also have rip-stop properties and/or may have suitable structural strength and stability and other performance properties to form the primary structural component of the inflatable device 16. The high-friction and/or low-friction materials can also be treated with a water repellant, such as polytetrafluoroethylene (PTFE). In other embodiments, the high-friction and/or low-friction materials may include any combination of these components, and may contain other components in addition to or instead of these components.

Generally, the high friction material has a coefficient of friction that is higher than the coefficient of friction of the low friction material. In one embodiment, the coefficient of friction for the high-friction material is about 8 to 10 times higher than the coefficient of friction of the low friction material. In another embodiment, the coefficient of friction for the high-friction material is between 5 and 10 times higher, or at least 5 times higher, than the coefficient of friction of the low friction material. The coefficient of friction, as defined herein, can be measured as a direct proportion to the pull force necessary to move either of the materials in surface-to-surface contact with the same third material, with the same normal force loading. Thus, in the embodiments above, if the pull force for the high-friction material is about 8 to 10 times greater than the pull force for the low friction material, with the same contact material and normal loading, the coefficients of friction will also be 8 to 10 times different. It is understood that the coefficient of friction may vary by the direction of the pull force, and that the coefficient of friction measured may be measured in a single direction. For example, in one embodiment, the above differentials in the coefficients of friction of the high-friction material and the low friction material may be measured as the coefficient of friction of the low friction material based on a pull force normal to the side edges 36 and the coefficient of friction of the high-friction material based on a pull force normal to the head and foot edges 32, 34.

Additionally, the coefficient of friction of the interface between the high-friction material and the high-friction pad 18 is greater than the coefficient of friction of the interface between the low friction material and the support surface 12 (which may include a bed sheet). It is understood that the coefficients of friction for the interfaces may also be measured in a directional orientation, as described above. In one embodiment, the coefficient of friction for the interface of the high-friction material is about 8-10 times higher than the coefficient of friction of the interface of the low friction material. In another embodiment, the coefficient of friction for the interface of the high-friction material is between 5 and 10 times higher, or at least 5 times higher, than the coefficient of friction of the interface of the low friction material. It is understood that the coefficient of friction for the interface could be modified to at least some degree by modifying factors other than the inflatable device 16. For example, a high-friction material (e.g., substance or surface treatment) may be applied to the bottom surface of the pad 18, to increase the coefficient of friction of the interface, which may be done in addition to, or in place of, using the high-friction material on the inflatable device 16. An example of a calculation of the coefficients of friction for these interfaces is described in greater detail in U.S. Patent Application Publication No. 2012/0186012, published Jul. 26, 2012, which is incorporated by reference herein in its entirety and made part hereof, which calculation is made using a rip-stop nylon material as the low friction material and a knitted material treated with a hot melt adhesive as the high-friction material. The relative coefficients of friction of the high-friction material and the low friction material used in the example calculation are also described in the aforementioned publication.

Now referring to FIGS. 7-12, the high-friction pad 18 is shown and described in greater detail. The high-friction pad 18 acts to hold the patient 66 in place when the inflatable device 16 is used for a number of different patient positionings. The high-friction pad 18 may be made of a material with a high coefficient of friction such as to increase the friction between the patient 66 and the inflatable device 16. The high-friction pad 18 is typically made from a different material than the inflatable device 16, and can absorb fluids that may be generated by the patient 66. The high-friction pad 18 may also be a low-lint pad, for less risk of wound contamination, and is typically disposable and replaceable, such as when soiled. In some embodiments, the high-friction pad is made of open cell foam. In other embodiments, the high-friction pad is gel impregnated polyether foam. The top and bottom surfaces 78, 79 of the high-friction pad 18 may have the same or different coefficients of friction. Additionally, the high-friction pad 18 illustrated in the embodiment shown is substantially shorter in length than the inflatable device 16 but may be a different size in other embodiments. In one embodiment, the high-friction pad 18 may form an effective barrier to fluid passage on one side (e.g., the underside), in order to prevent the inflatable device 16 from being soiled, and may also be breathable in order to permit flow of air, heat, and moisture vapor away from the patient and lessen the risk of pressure ulcers (bed sores). The high-friction pad 18 may be configured differently in other embodiments. The high-friction pad 18 has a thickness of approximately 0.5 inch+/−0.125 inch, and in some embodiments is as thick as 1.0 inch or as thin as 0.125 inch.

Figure 7:
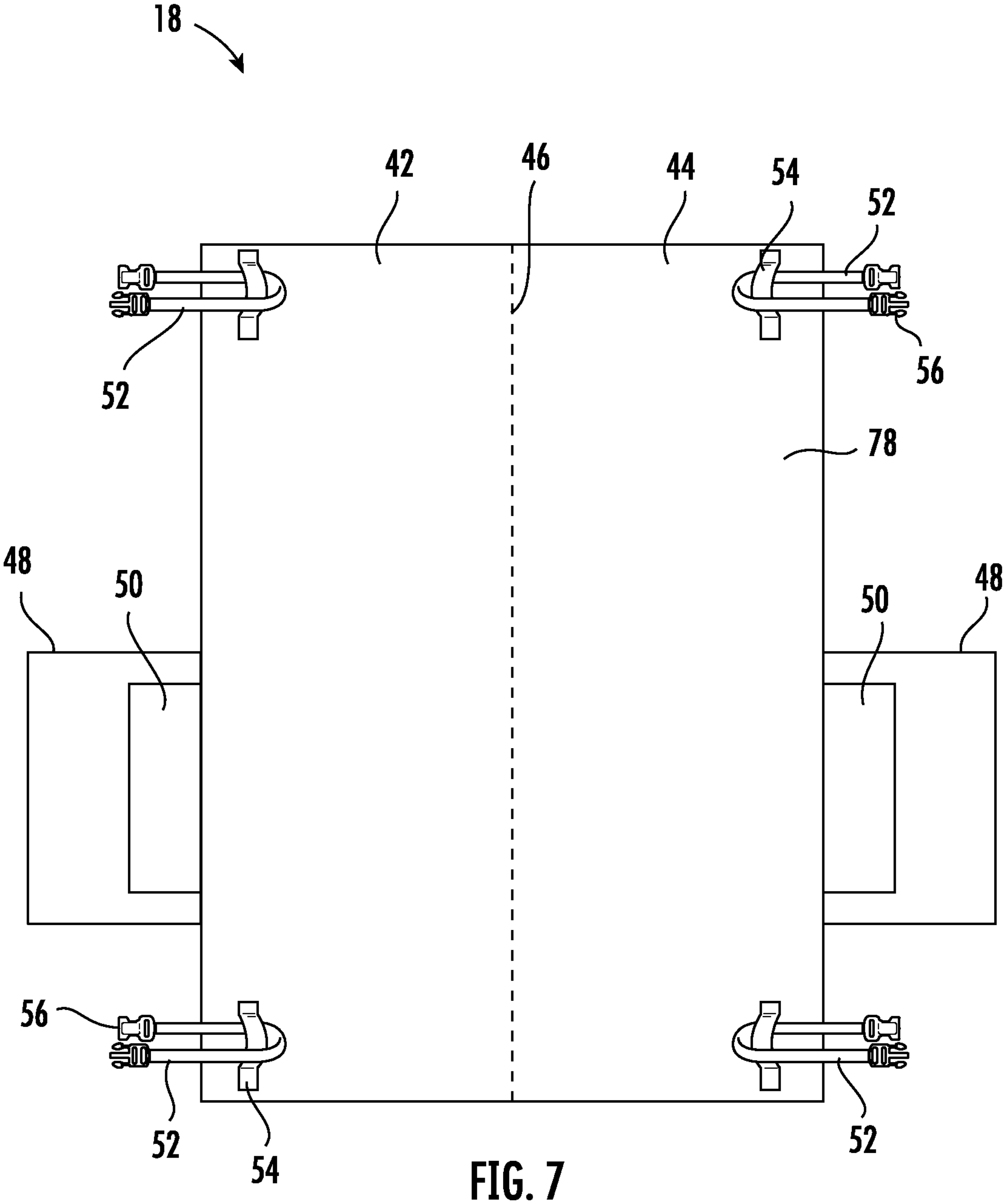
FIG. 7 is a top view of a high-friction pad, according to an embodiment.

FIG. 7 shows the top surface 78 of the high-friction pad 18. The high-friction pad 18 generally includes a first section 42 and a second section 44 which are separated by perforations 46. In one embodiment, the perforations 46 are cuts along a central portion the high-friction pad 18 that are configured to be torn to separate the first section 42 from the second section 44 of the high-friction pad 18. The high-friction pad 18 also includes arm wraps 48, which are configured to secure the patient's arm 72 in place when the high-friction pad 18 is in use with a patient 66. The arm wraps 48 are located in a portion of the high-friction pad 18 that would support the patient's 66 torso, such that the patients arms 72 would lie near the arm wraps 48. The arm wraps 48 include openings 50, which allow access to the patient's arm 72 while in use, for example, for delivery of intravenous (IV) fluids. The high-friction pad 18 also includes a plurality of connecting systems configured to attach the high-friction pad 18 to the support structure 14. In the connecting systems, straps 52 are looped through anchors 54, which may be stitched or otherwise attached to the top surface 78 of the high-friction pad 18. Straps 52 contain buckles 56, which are configured to wrap around the support structure 14 and connect together. In other embodiments, the straps 52 may contain a different attachment mechanism, such as snaps or hook and loop fastener material. In the embodiment shown, the high-friction pad 18 has four anchors 54, located within the four corners of the high-friction pad 18. In other embodiments, there may be additional anchors 54 located along the top, bottom, or side edges of the high-friction pad 18. In still other embodiments, there may be only two anchors 54, one on either side of the high-friction pad 18 or there may be no anchors 54 on the high-friction pad 18, with all connecting systems being disposed instead on the inflatable device 16.

Figure 8:
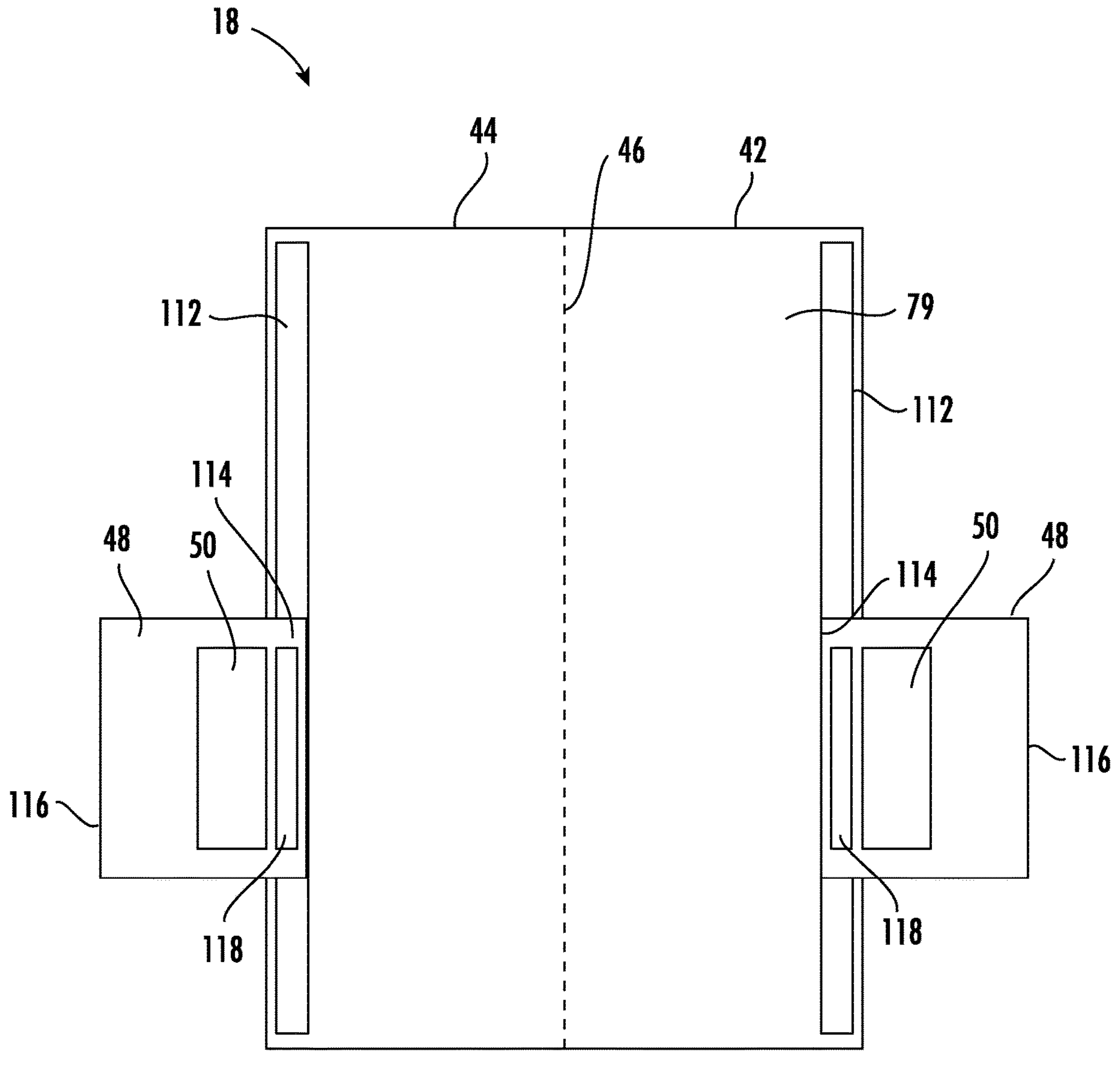
FIG. 8 is a bottom view of one embodiment of the high-friction pad, according to an embodiment.

FIG. 8 shows the bottom surface 79 of the high-friction pad 18. The bottom surface 79 includes counterpart connection strips 112, which are configured to attach and connect to the connection strips 91 on the top surface 28 of the inflatable device 16. Counterpart connection strips 112 extend from a top portion of the high-friction pad 18 to a bottom portion of the high-friction pad 18 along either side. In some embodiments, the counterpart connection strips 112 also extend along the top side and the bottom side of the high-friction pad 18. In some embodiments, the counterpart connection strips 112 are made of a first portion hook and loop fastening material, for engagement with a counterpart portion of the hook and loop fastener on the inflatable device 16. In other embodiments, the counterpart connection strips 112 are a different attachment mechanism, such as a plurality of snaps or other fastening mechanisms. Also shown in FIG. 8, the arm wraps 48 include an interior portion 114 and an exterior portion 116. The interior portion 114 of the arm wraps 48 include arm strap fastener 118, such as a hook and loop material, configured to connect or otherwise attach the exterior portion 116 of the arm wraps 48 with the interior portion 114 of the arm wrap 48 when wrapped around the patient's arm 72.

A method of attachment of the arm wraps 48 is shown generally in FIGS. 9-10. The patient's arm 72 is placed on the outside of the high-friction pad 18 and the arm wrap 48. The arm wrap 48 is then wrapped outwards and around the patient's arm 72, such that the exterior portion 116 of the arm wrap 48 wraps around the patient arm 72 and connects to the arm strap fastener 118 on the interior portion 114 of the arm wrap 48. The exterior portion 116 may contain an additional fastener strip to connect to the arm strap fastener 118 on the interior portion 114, or may be of a material such that the material itself will attach to the arm strap fastener 118 on the interior portion 114 of the arm wrap 48. When the patient's arm 72 is strapped into arm wrap 48, the opening 50 on the arm wrap 48 allows a healthcare provider to retain access to the patient's arm 72, such as to insert or change an IV. In other embodiments, the arm wrap 48 may be of a solid structure and contain no openings, such that the entirety of the patient's arm 72 is covered by arm wrap 48.

Figure 11:
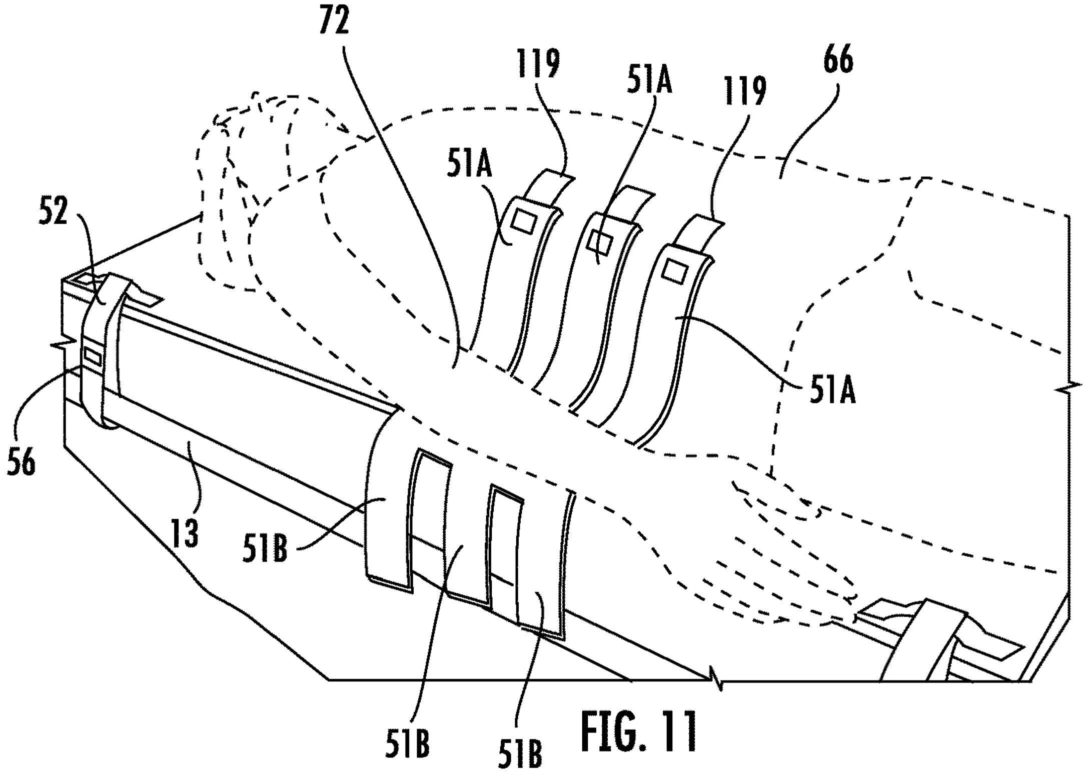
FIG. 11 is a detailed view of one embodiment of an arm strap being wrapped around a patient's arm, according to an embodiment.
Figure 12:
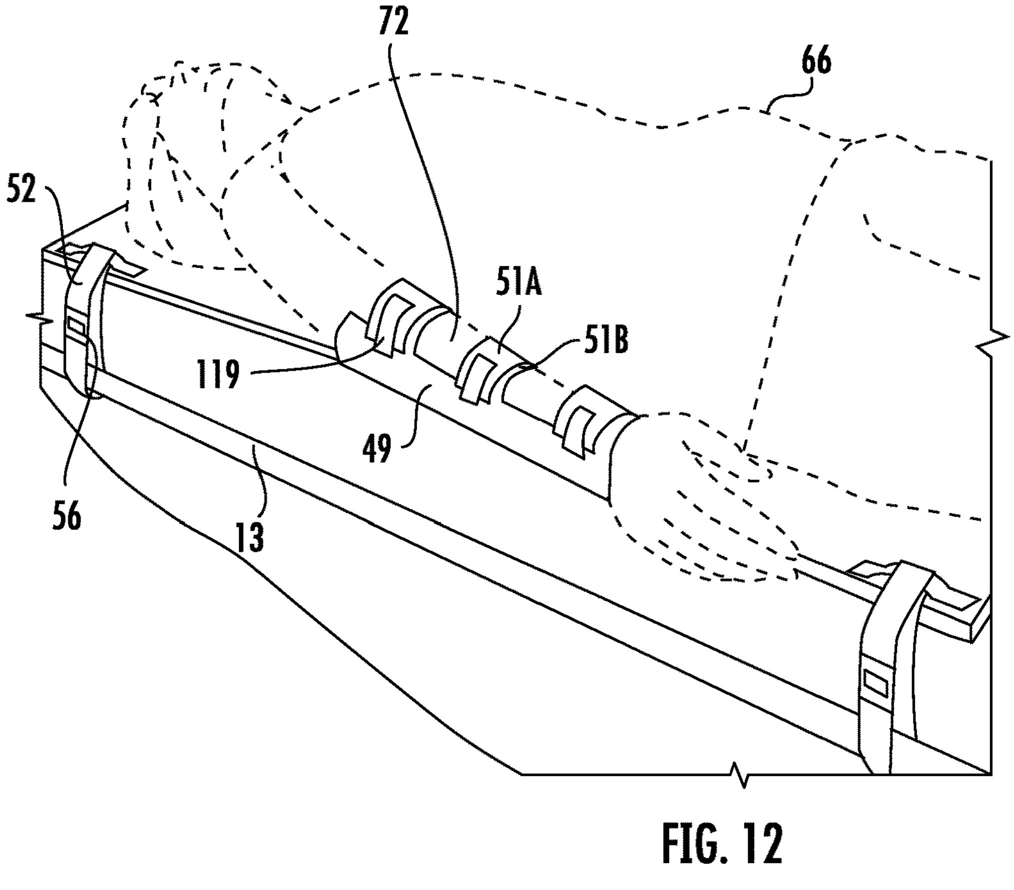
FIG. 12 is a detailed view of the arm strap of FIG. 11 in use with a patient, according to an embodiment.

An alternative arm wrap 49 configuration and method of attachment of the arm wraps 49 is shown generally in FIGS. 11-12. The arm wraps 49 are located in a portion of the high-friction pad 18 that would support the patient's 66 torso, such that the patient's arms 72 lie near the arm wraps 49. The arm wraps 49 include a plurality of straps 51 having a first strap portion 51A and a second strap portion 51B. The first strap portion 51A of straps 51 wrap around the patient's arm 72 and connect to the second strap portion 51B of straps 51. In the embodiment shown, the first strap portions 51A have a securing strip 119, which extends from an end of the first strap portion 51A. In some embodiments, the securing strips 119 are made of a first portion of a hook and loop fastening material, for engagement with a counterpart portion of the hook and loop fastener on the second strap portion 51B. In other embodiments, the securing strips 119 are a different attachment mechanism, such as a plurality of snaps or other fastening mechanisms. In the embodiment shown, arm wrap 49 has three straps 51. In other embodiments, arm wrap 49 may have any number of straps 51 with space between each strap 51. The space between the straps 51 allows access to the patient's arm 72 while in use, for example, for delivery of intravenous (IV) fluids.

In some embodiments, the arm wrap 49 comprises two separate pieces: one attached to the first strap portions 51A and one attached to the second side portions 51B. In some embodiments, arm wrap 49 may be attached to the high-friction pad 18 by inserting both pieces, opposite the ends of strap portions 51A-B, between the high-friction pad 18 and the counterpart connection strips 112 on the bottom of the high-friction pad 18. In some embodiments, the pieces of the arm wraps 49 may then be sewn or otherwise attached to both the high-friction pad 18 and the counterpart connection strips 112. In still other embodiments, the arm wraps 49 may be sewn or otherwise attached directly to the bottom surface 79 of the high-friction pad 18, such that they are in contact with the inflatable device 16. In other embodiments, the arm wraps 49 may consists of a single, continuous piece of material, such that the arm wrap 49 is folded at the location of attachment to the high-friction pad 18, wherein the straps 51 extend from the central fold. In still other embodiments, the arm wraps 49 may have a different attachment mechanism, such a plurality of snaps or hook and loop fasteners, to attach to the high-friction pad 18.

To secure the patient's arm 72 with the arm wraps 49, the patient's arm 72 is placed between the first strap portion 51A and second strap portion 51B straps. The first strap portions 51A are then wrapped outwards and around the patient's arm 72 while the second strap portions 51B are wrapped inwards and around the patient's arm 72, such that the first strap portions 51A overlap with the second strap portions 51B. The first strap portions 51A connect to the corresponding second strap portions 51B to secure the patient's arm 72 in place. In the embodiment shown, securing strips 119 are used to attach the first strap portions 51A to the second strap portions 51B. When the patient's arm is strapped into arm wrap 49, the space between the straps 51 allows a healthcare provider to retain access to the patient's arm 72, such as shown in FIG. 12.

Figure 13:
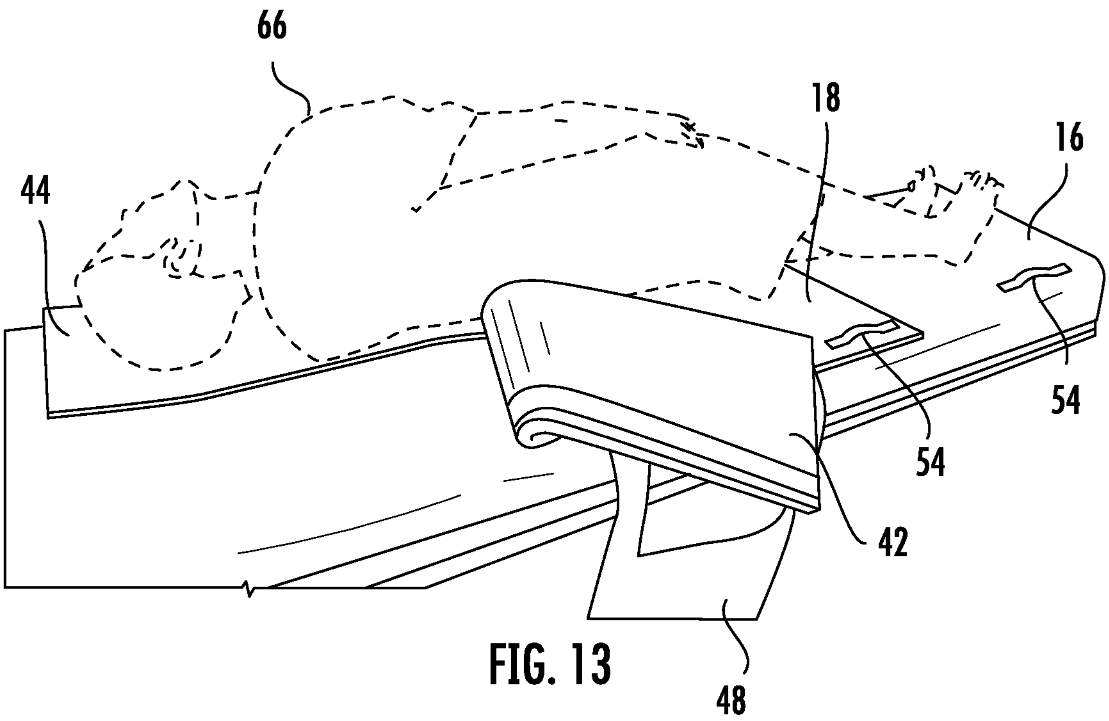
FIG. 13 is a first embodiment showing the removal of a first section of the high-friction pad, according to an embodiment.
Figure 14:
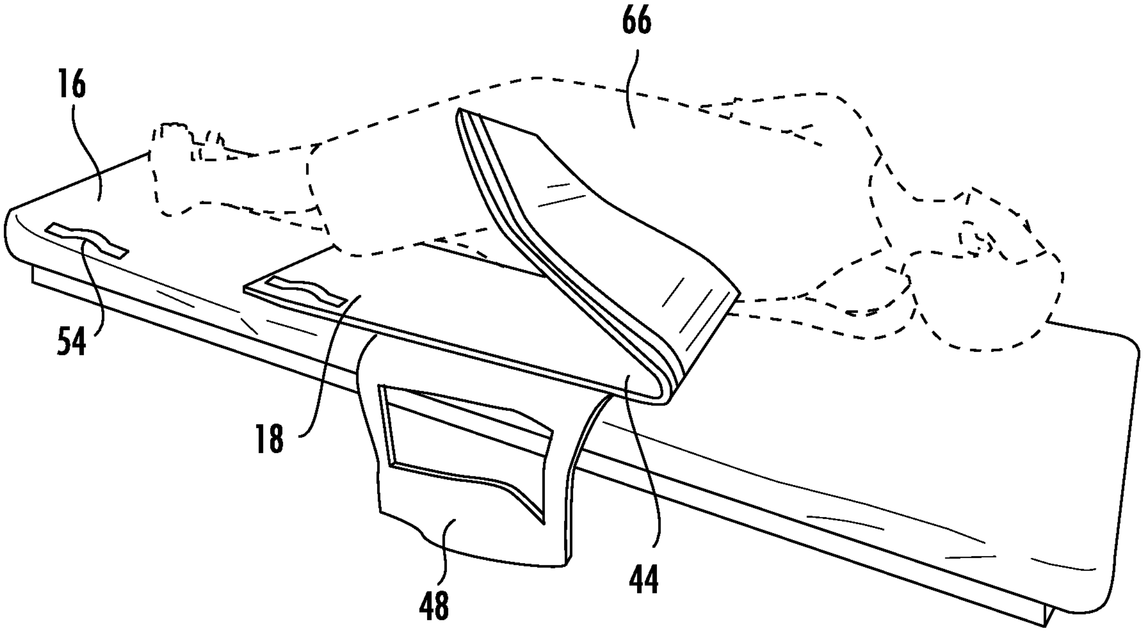
FIG. 14 is a first embodiment showing the removal of a second section of the high-friction pad, according to an embodiment.
Figure 15:
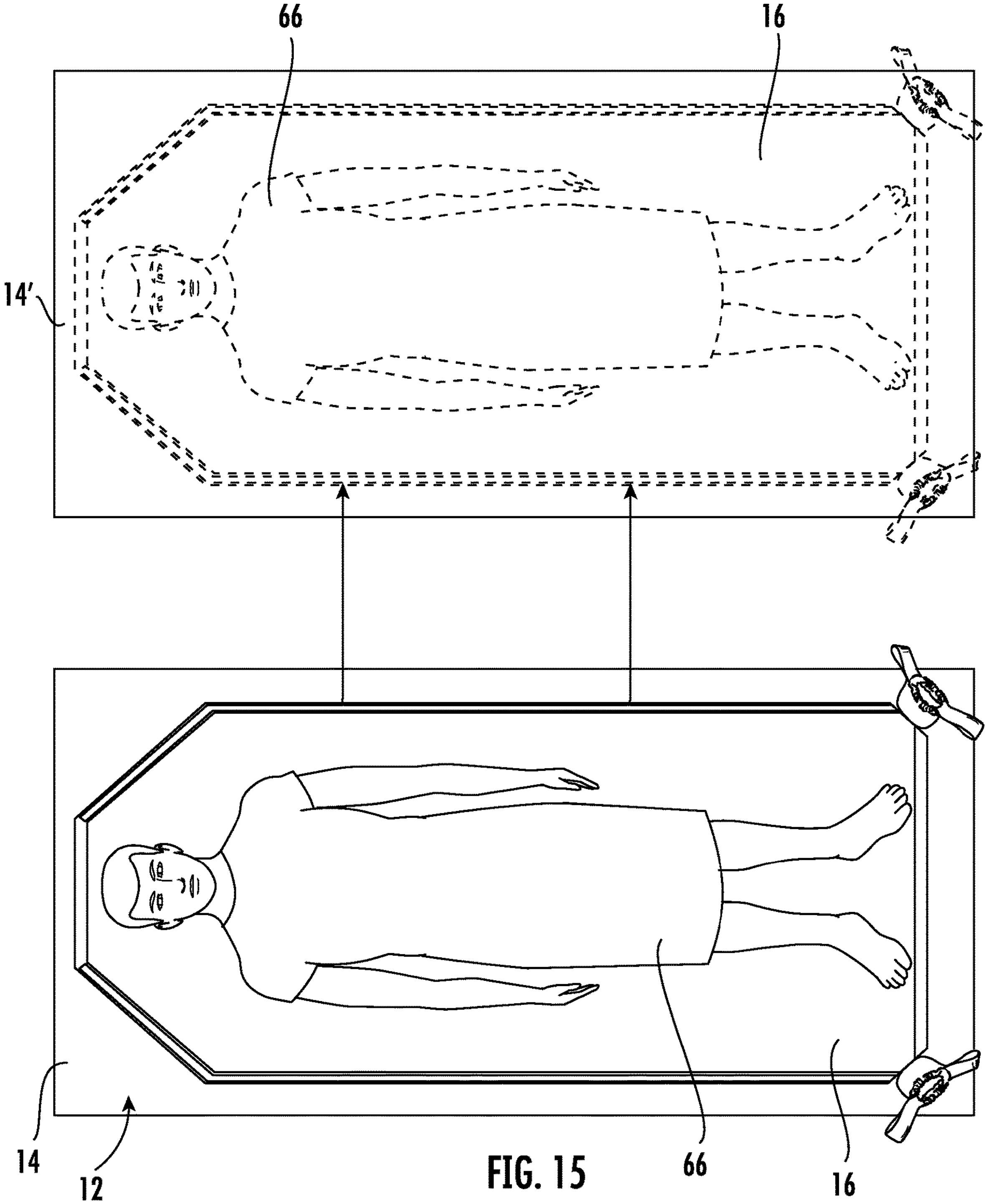
FIG. 15 is a top schematic view illustrating the use of the system of FIG. 1 to transfer a patient from one support structure to another support structure, according to an embodiment.
Figure 16:
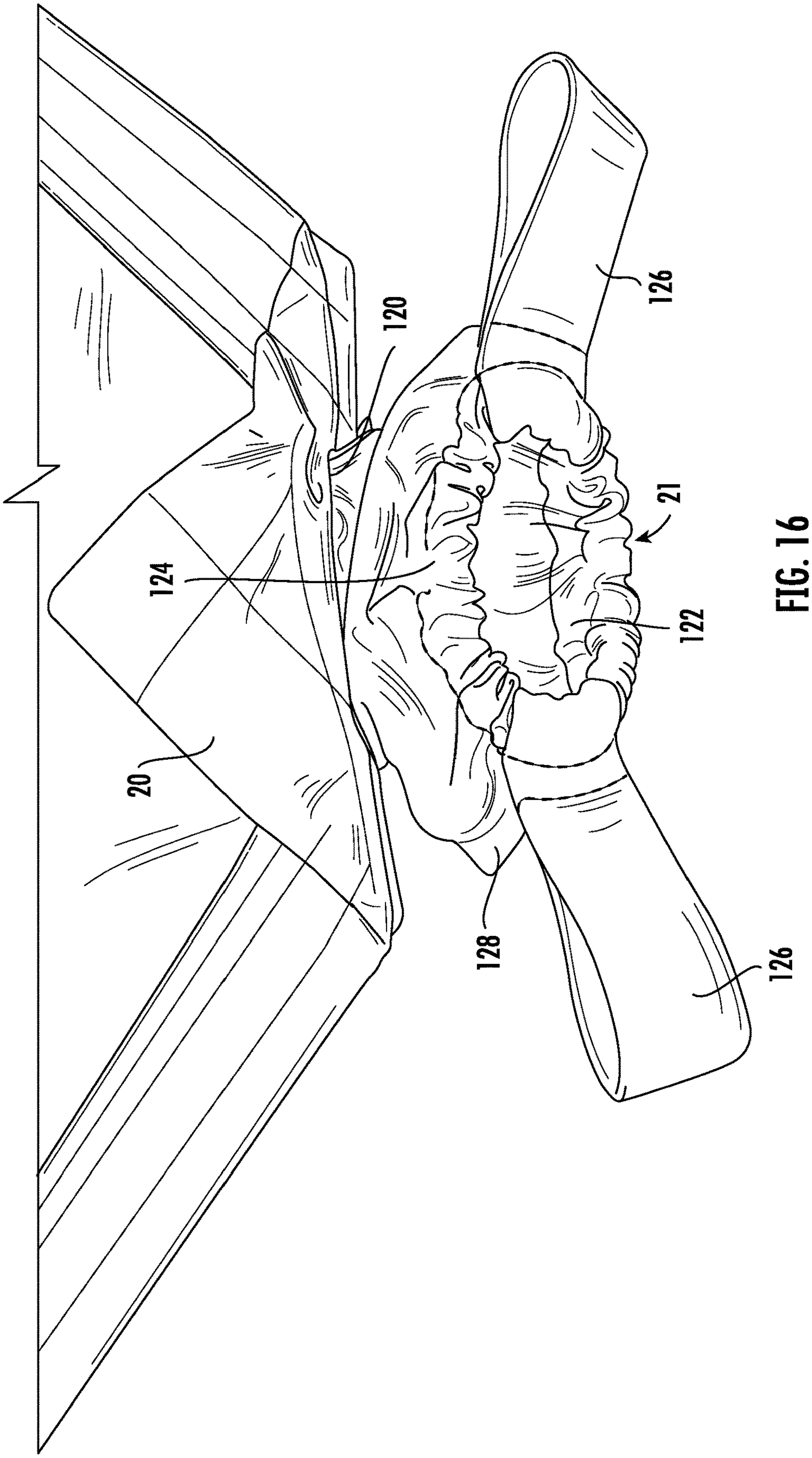
FIG. 16 is a detailed view of a port sock, according to an embodiment.

The perforations 46 of the high-friction pad 18 allow a healthcare provider to remove the high-friction pad 18 while in use with a patient 66, as depicted in FIGS. 13-14. When the high-friction pad 18 is positioned over the inflatable device 16, a patient 66 rests on top of the high-friction pad 18. After use of the high-friction pad 18, it is desirable to remove the high-friction pad 18, so that the inflatable device 16 may be used as a standalone device, for patient transfer or other purposes. To remove the high-friction pad 18, the patient 66 is gently rolled to a first side, such that the entirety of the patient's body lies within the first section 42 of the high-friction pad 18. The healthcare provider, or a second healthcare provider, may then rip, cut, or otherwise tear the high-friction pad 18 along the perforations 46 to remove the second section 44 of the high-friction pad 18. After removal of the second section 44 of the high-friction pad 18, the healthcare provider may then gently roll the patient to the other side, such that the entirety of the patient's body lies on the inflatable device 16. The healthcare provider may then remove the first section 42 of the high-friction pad 18. The healthcare provider may then roll the patient onto their back, such that they are lying flat on the top surface 28 of the inflatable device 16. After removal of the high-friction pad 18, the inflatable device 16 may be used for inflation and transfer of the patient 66 from one support structure 14 to another support structure 14', such as shown in FIG. 15.

The device, as shown in the embodiment of FIGS. 1-15, includes a plurality of inflation ports 20 and port socks 21 extending from the inflation ports 20. The inflatable device 16 contains two inflation ports 20, one located on either corner where the foot edge 34 meets the side edges 36. The port socks 21 have a first opening 120 and a second opening 122. The first opening 120 is configured to attach or connect to port 20, such as by sewing first opening 120 to port 20. The port sock 21 is connected to the inflatable device 16 in such a way that second port opening 122 is not flush with the side and foot edges 34, 36 of the inflatable device 16. In other words, when port sock 21 is attached to inflatable device 16, port sock 21 extends out from port 20 of inflatable device 16. Extending port sock 21 out from port 20 of the inflatable device 16 prevents port sock 21 or port 20 from bunching up and ensures that the inflatable device 16 remains flat. The port sock 21 can extend from the device at any desired angle. For example, the port sock 21 may direct the second port opening 122 at 45 degrees from the inflatable device 16 or 90 degrees from the side edge 36 of the inflatable device 16.

Port opening 122 of port sock 21 has a retaining mechanism 124, which is provided in the form of an elastic ring. Side handles 126 (e.g., straps or tabs) are disposed at or along an edge of port opening 122 of port sock 21. Side handles 126 are configured to allow for pulling retaining mechanism 124 to stretch open port opening 122 so that an air output 130 can be inserted into port opening 122. Side handles 126 are also configured to allow for pulling retaining mechanism 124 to open port opening 122 for removal of the air output 130. Port sock 21 may also include side pouches 128 configured to engage with a specifically designed nozzle of air output 130, such as the nozzle shown in FIG. 17. The side pouches 128 are a portion of the port sock 21 having an increased diameter relative to the opening 120 and/or 122. In the embodiment shown, the side pouches 128 are two oppositely disposed peak-shaped portions, formed by an increase in diameter from the opening 122 to a maximum pouch diameter, and then decreasing back down to the diameter of the opening 120.

Figure 17A:
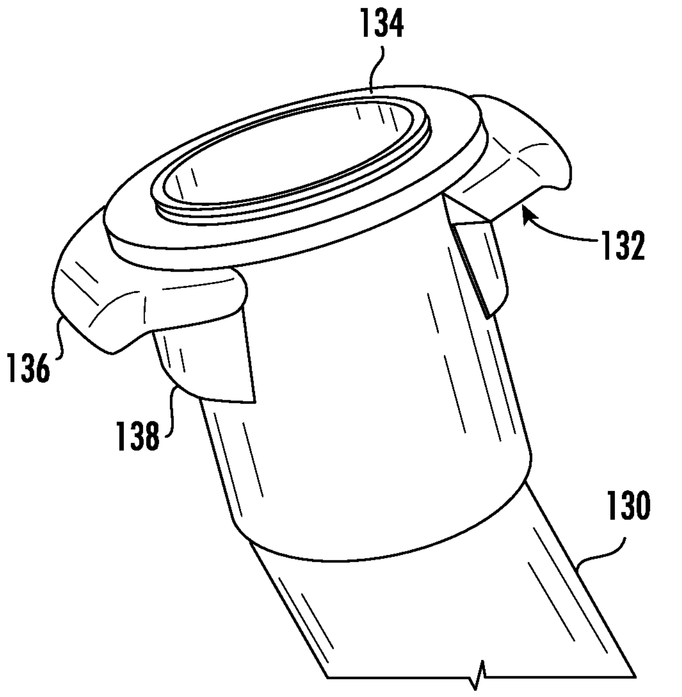
FIGS. 17A and 17B are detailed views of a nozzle portion of an air output, according to some embodiments.
Figure 17B:
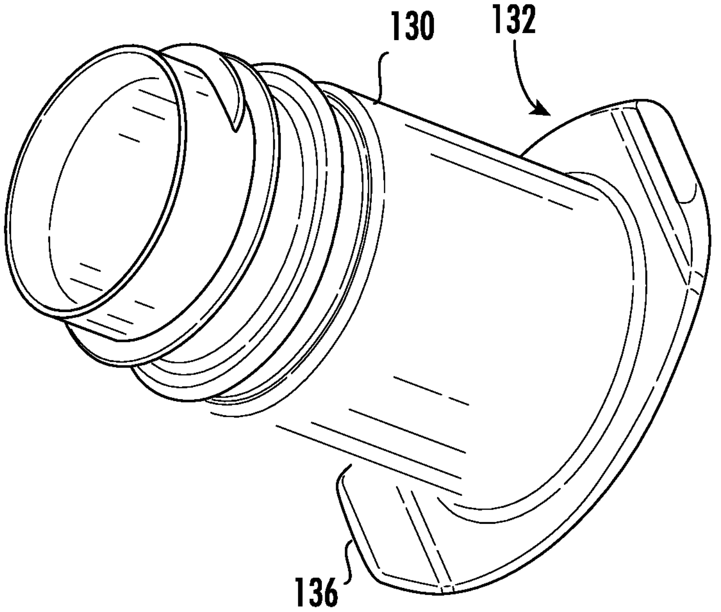
Figure 18:
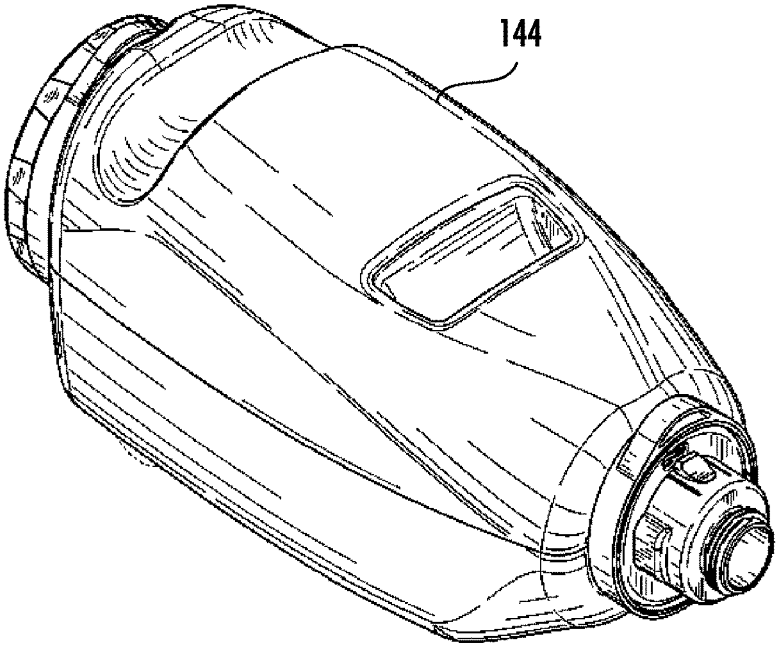
FIG. 18 is a perspective view of one embodiment of a pump that is usable as an air output.

A nozzle of an air output 130 which is configured to be disposed within port opening 122 is show in FIGS. 17A and 17B. In the embodiment shown in FIG. 17A, a clip 132 is configured to be disposed on a lip 134 of the nozzle of the air output 130 or otherwise around a distal portion of the nozzle. Clip 132 has a C-shape such that it can be easily put on and taken off of the nozzle. Clip 132 has any suitable configuration or design. For example, clip 132 includes extended side portions (e.g., flanges) 136 disposed along a front surface of clip 132 and which are configured to bend away from the front surface of clip 132 and a protrusion 138 which extends out and away from the top surface of clip 132. Clip 132 is configured such that when clip 132 is installed on the nozzle and the nozzle is placed in port sock 21, the extended side portions (e.g., flanges) 136 of clip 132 are disposed within side pouches 128 of port sock 21. Clip 132 is configured such that when it is installed on the nozzle, protrusion 138 of clip 132 wraps around an outer surface of nozzle in a secure fit. Alternatively, protrusion 138 of clip 132 is configured to snap into an inner surface of nozzle. Clip 132 is configured to prevent unintentional disengagement of the nozzle from port opening 122 or pouches 128 due to its increased diameter relative to the port opening 122. Additionally, the downward bend of extended side portions 136 are configured to prevent unintentional disengagement of the nozzle from port opening 122. Also, clip 132 is configured to prevent the nozzle from rotating relative to port opening 122 when the nozzle is disposed within port opening 122 because of the corresponding shape of the clip 132 with the side pouches 128 which allow positioning of the clip 132 in the port sock 21 in substantially only that orientation. In some aspects, clip 132 may be removable. In some aspects, clip 132 is manufactured as a single, unitary component with the nozzle, as shown in the embodiment of FIG. 17B. An embodiment of an air pump 144 is shown in FIG. 18. The air pump 144 may include a hose (not shown) that serves as the air output 130 having a distal end as described above and shown in FIGS. 17A and 17B.

Figure 20:
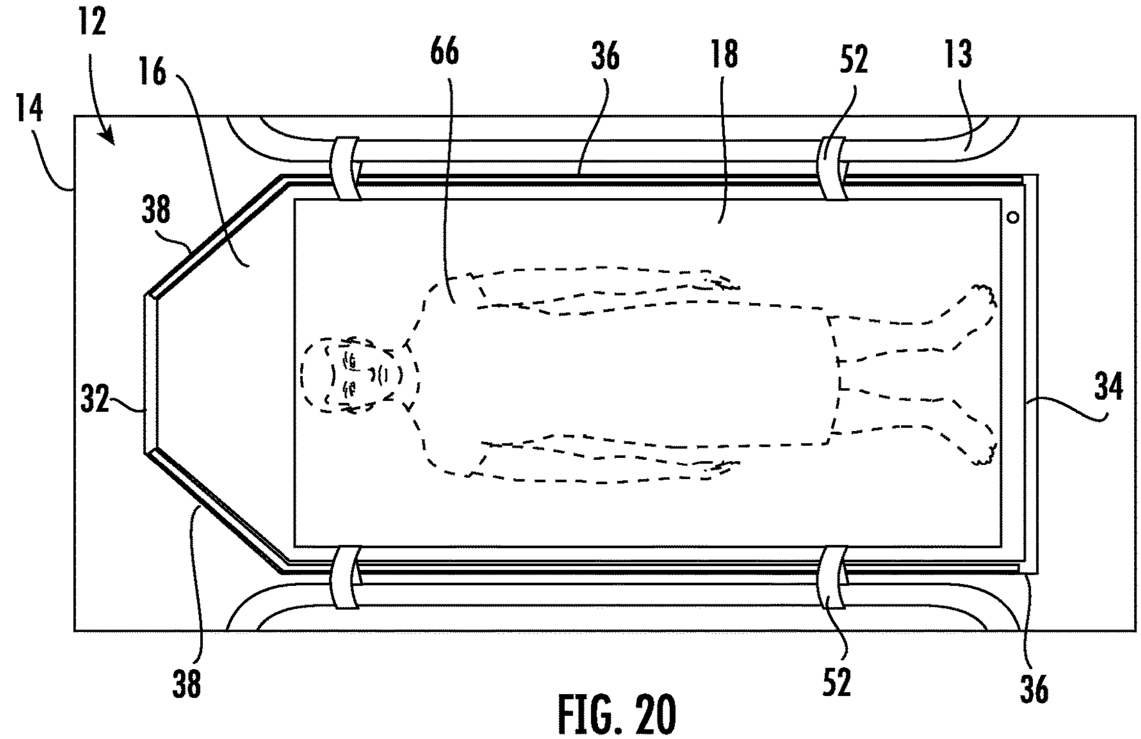
FIG. 20 is a top view of a high-friction pad in use with the inflatable patient support device of FIG. 19, shown in the non-inflated state, according to an embodiment.
Figure 21:
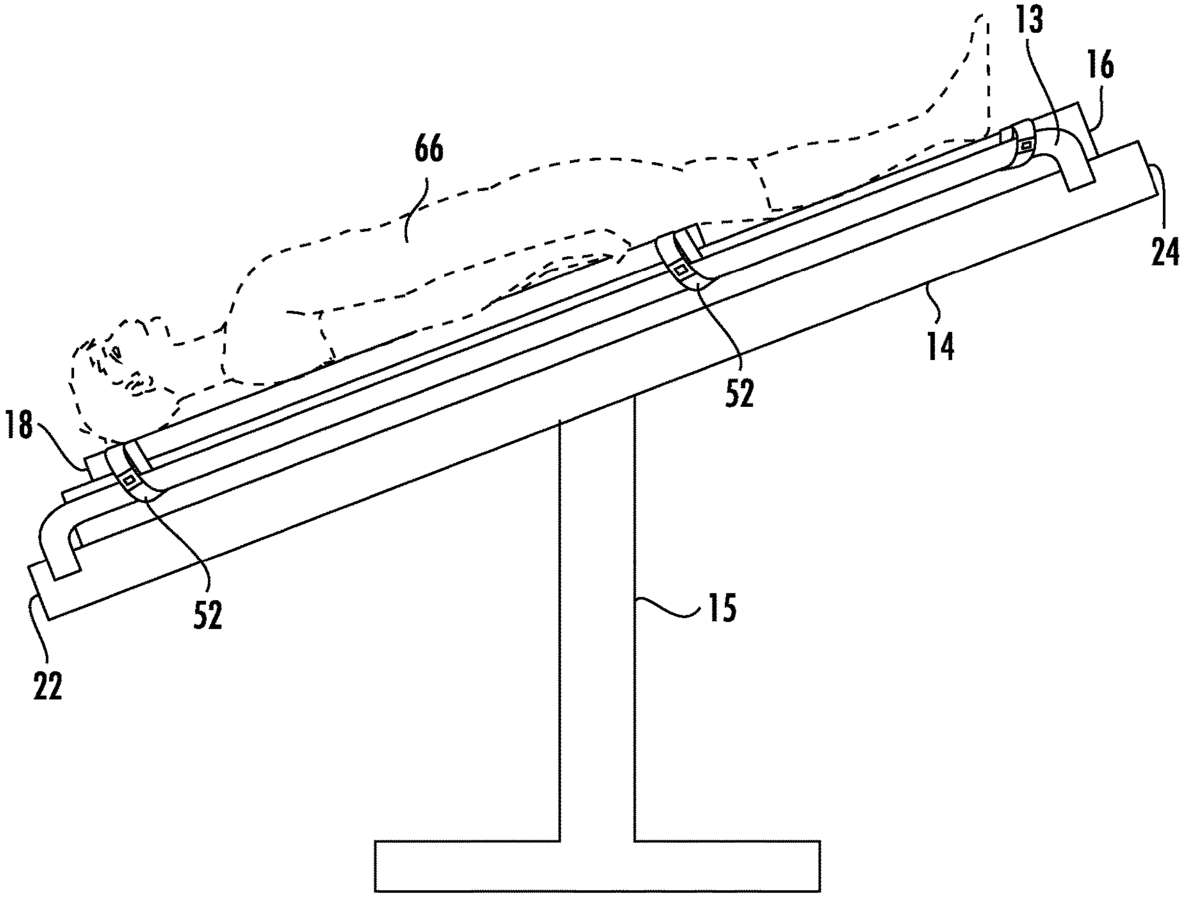
FIG. 21 is a side view of a third embodiment of an inflatable patient support system in use on a support structure attached to the floor.
Figure 22:
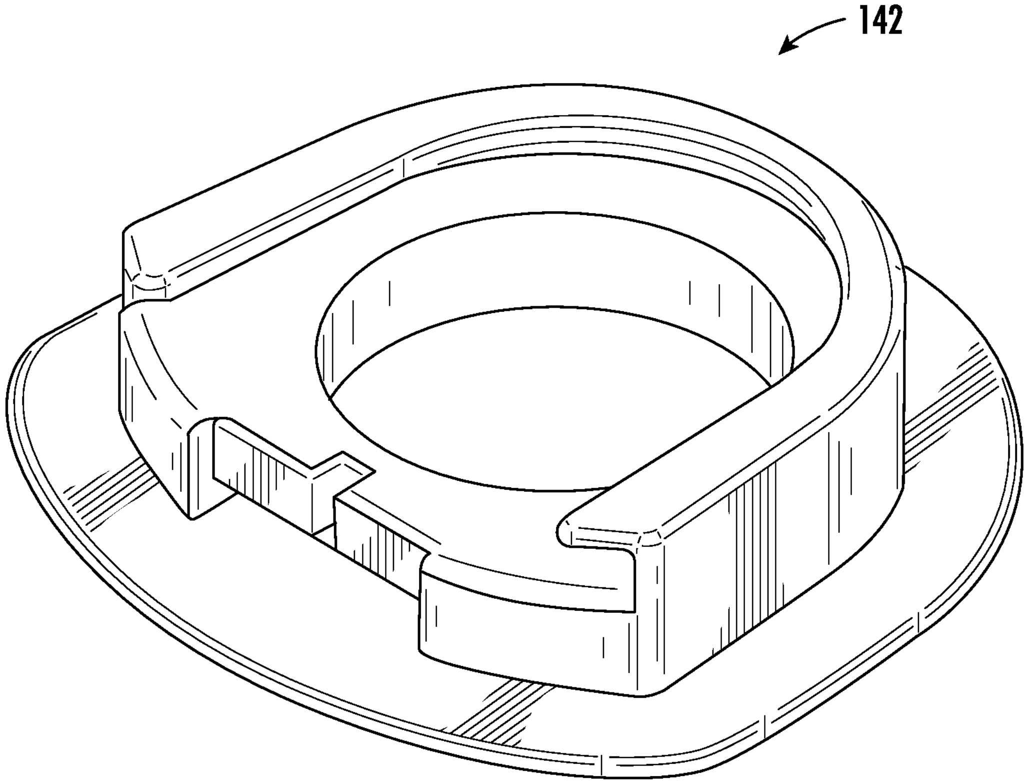
FIG. 22 is a perspective view of an inflation port usable in connection with the inflatable patient support device of FIG. 19.

FIGS. 19-23 depict an alternative embodiment of the system 10. In this embodiment, the high-friction pad 18 has substantially the same length as the inflatable device 16 and extends from proximate the chamfered edges 38 of the inflatable device 16 to proximate the foot edge 34 of the inflatable device 16. In this embodiment, the high-friction pad 18 contains a plurality of straps 52, which are attached directly to the high-friction pad 18 without the use of anchors 54. In this embodiment, the inflatable device 16 does not have any straps 52. The straps 52 are wrapped around the rail 13 of the support structure 14, as shown in FIGS. 20-21 and may be tied or otherwise attached to the rails 13 using, for example, snaps. In an embodiment, shown in FIG. 20, the high-friction pad 18 contains a total of four straps, two located near the head and two located near the knees of the patient 66 on both sides of the high-friction pad 18. In an alternative embodiment, shown in FIG. 21, the high-friction pad 18 contains a total of six straps, two located near each of the head, waist, and feet of the patient 66 on the high-friction pad 18.

Figure 23:
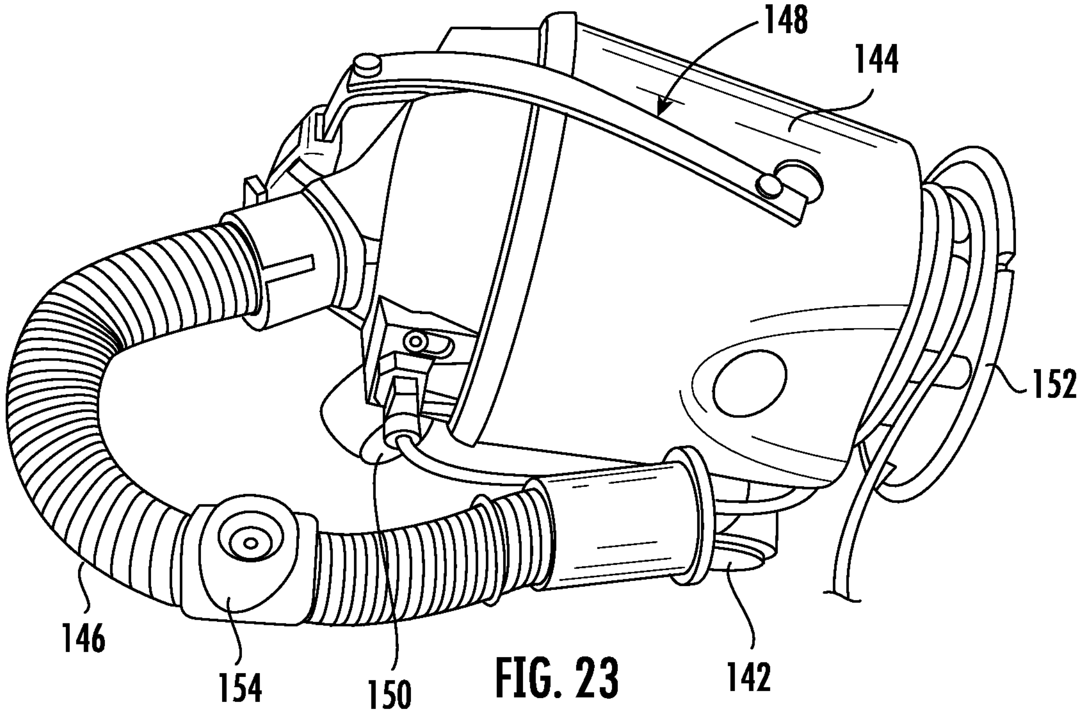
FIG. 23 is a perspective view of one embodiment of a pump that is usable as an air output in connection with the inflation port of FIG. 22.

Referring back to the alternative embodiment shown in FIG. 19, the inflatable device 16 includes a single inflation port 20 with an opening 140 located adjacent one of the side edges 36 proximate the foot edge 34. The inflation port includes a retaining mechanism 142 configured to retain the portion of the air output 130 in communication with the opening 140 of the inflation port 20. The retaining mechanism 142 is shown in greater detail in FIG. 22. In one embodiment, the retaining mechanism 142 is configured to attach to an air output 130 of an air pump. A second embodiment of the pump 144 is shown in FIG. 23. The pump 144 in this embodiment has a hose 146 that functions as the air output 130, as described above. Additionally, the pump 144 may have an attachment mechanism 148 that is configured to releasably attach the pump 144 to a structure such as a railing of the support structure 14. In the embodiment of FIG. 23, the attachment mechanism 148 is a strap, but a different structure may be used, such as a hook, carabiner clip, etc. The pump 144 in FIG. 23 includes wheels 150 for mobility, and the wheels 150 are placed along the longest dimension of the pump 144, such that the pump 144 is configured to sit in a low-profile configuration when sitting on the wheels 150. One or more of the wheels 150 may be in the form of casters in one embodiment. This low-profile configuration may permit the pump 144 to sit under the support structure 14 and out of the way when not in use. The pump 144 also includes a standing base 152 configured to support the pump 144 in a standing configuration so that the wheels 150 do not contact the ground and the pump 144 does not move freely. As another example, the pump 144 may include one or more switches 154 for powering the pump 144 on/off and potentially other controls as well. The switch 154 in the embodiment of FIG. 23 is positioned near the outlet end of the hose 146 for enhanced accessibility to caregivers during use. Such a switch 154 or switches may include one or more hard-wired switches and/or remote switches (e.g., an RF switch). The pump 144 may include additional features as desired.

The inflatable device 16 may be configured in alternative arrangements, such as any of those described in U.S. patent application Ser. No. 15/594,195 entitled "Patient Transport Apparatus" and filed May 12, 2017, which is hereby incorporated by reference in its entirety.

All or some of the components of the system 10 can be provided in a kit, which may be in a pre-packaged arrangement. For example, the inflatable device 16 (deflated) and the high-friction pad 18 may be provided in a pre-folded arrangement or assembly, with the high-friction pad 18 positioned in confronting relation with the top surface 28 of the inflatable device 16, in approximately the same position that they would be positioned in use, and the inflatable device 16 and high-friction pad 18 be pre-folded to form a pre-folded assembly. This pre-folded assembly can be unfolded when placed beneath a patient. It is understood that different folding patterns can be used. The pre-folded inflatable device 16 and high-friction pad 18 can then be unfolded together on the support structure 14 to facilitate use of the system 10. Additionally, the inflatable device 16 and high-friction pad 18 can be packaged together, by wrapping with a packaging material to form a package, and may be placed in the pre-folded assembly before packaging. Other packaging arrangements may be used in other embodiments. In other embodiments, the system may also include the air pump 144.

It is understood that all embodiments of the inflatable device 16 shown and described herein may be utilized in the same or a similar method, with the same or similar functionality. As described above, the inflatable device 16 and high-friction pad 18 are placed underneath the patient 66. The system 10 may be used to transfer the patient to a support structure 14. Transfer of the patient is facilitated by inflating the inflatable device 16 to ease the burden on the patient handler and make the transfer easier, as described above. Once on the intended support structure, the inflatable device 16 may be deflated. The patient will then be resting on the support structure 14 above the deflated inflatable device 16 and the high-friction pad 18. The support structure 14 can then be manipulated to change the position of the patient 66, as described above, with the high-friction pad 18 acting to hold the patient 66 in place upon the inflatable device 16 and the high-friction pad 18.

Though the foregoing system 10, and the components thereof, are intended for single use and then disposal, the system 10 and any of the components thereof may be refurbished for reselling and reusing. Refurbishment of the device may include steps such as inspecting the device, removing foreign particles, stains, or odors by washing one or more surfaces of the device, repairing tears or damage to the device, repairing or supplementing the stitching, such as at the seams, replacing any elements or components such as the high-friction pad 18, replacing missing items from a kit, etc. Refurbishing may include decontaminating the system and/or any of the components such as by sterilization means, such as the use of gamma radiation, electron-beam radiation, X-ray radiation, Ethylene oxide (EtO), steam, such as through the use of an autoclave, or any combination thereof. And, refurbishing and reselling may include repackaging the system and elements thereof.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. A method for positioning a patient in an inclined position on a support device, comprising:

providing a patient positioning system, the system comprising:

an inflatable device comprising a top sheet of material connected to a bottom sheet of material, the top sheet and the bottom sheet defining a cavity to be inflated, and an input configured for receiving air to inflate the device;

a high-friction pad removably attached to the top sheet of material, the high-friction pad comprising a first section and a second section, and perforations along a central portion of the high-friction pad separating the first section and the second section; and at least one attachment system coupled to the patient positioning system and configured to maintain the device on a support surface of the support device;

placing the inflatable device on the support surface such that the bottom sheet of material faces the support surface and the high-friction pad is positioned on top of the inflatable device;

attaching the patient positioning system to a portion of the support device using the attachment system;

positioning a patient on the patient positioning system; and moving the support device and the patient into an inclined position;

wherein the high-friction pad is configured to reduce slipping of the patient when the support device is tilted at an incline.

2. The method of claim 1, further comprising returning the support device to a position substantially parallel with the floor and removing the high-friction pad from between the patient and the top sheet.

3. The method of claim 2, wherein removing the high-friction pad comprises:

rolling the patient onto the patient's side to expose the first section of the high-friction pad;

detaching the first section from the top sheet and from the second portion of the high-friction pad by separating the high-friction pad along the perforations;

rolling the patient onto the other side, such that the patient is positioned directly on the top sheet and the section portion of the high-friction pad is exposed; and detaching the second portion from the top sheet.

4. The method of claim 2, further comprising inflating the inflatable device to assist with transferring the patient from the support device.

* * * * *